US010283833B2

(12) United States Patent
Okada

(10) Patent No.: US 10,283,833 B2
(45) Date of Patent: May 7, 2019

(54) CONNECTOR DEVICE AND COMMUNICATION DEVICE

(71) Applicant: SONY SEMICONDUCTOR SOLUTIONS CORPORATION, Kanagawa (JP)

(72) Inventor: Yasuhiro Okada, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 15/752,937

(22) PCT Filed: Jul. 29, 2016

(86) PCT No.: PCT/JP2016/072372
§ 371 (c)(1),
(2) Date: Feb. 15, 2018

(87) PCT Pub. No.: WO2017/033668
PCT Pub. Date: Mar. 2, 2017

(65) Prior Publication Data
US 2018/0248245 A1 Aug. 30, 2018

(30) Foreign Application Priority Data

Aug. 26, 2015 (JP) .................................. 2015-166388
May 31, 2016 (JP) .................................. 2016-108493

(51) Int. Cl.
H04B 3/52 (2006.01)
H01P 1/08 (2006.01)
(Continued)

(52) U.S. Cl.
CPC ................ H01P 5/02 (2013.01); H01P 1/042 (2013.01); H04B 7/24 (2013.01)

(58) Field of Classification Search
CPC ...... H01P 1/08; H01P 3/16; H01P 5/00; H01P 5/02; H04B 3/00; H04B 3/52
See application file for complete search history.

(56) References Cited

U.S. PATENT DOCUMENTS 805,692 A * 11/1905 Werner .................... H01P 1/04
2,930,008 A * 3/1960 Walsh ...................... H01P 1/08
333/252
(Continued)

FOREIGN PATENT DOCUMENTS

EP 3324481 A1 * 5/2018 ............ H01P 3/165
GB 805692 A * 12/1958 ............ H01P 11/002
(Continued)

OTHER PUBLICATIONS

International Search Report prepared by the Japan Patent Office dated Oct. 6, 2016, for International Application No. PCT/JP2016/072372.

Primary Examiner — Blane J Jackson
(74) Attorney, Agent, or Firm — Sheridan Ross P.C.

(57) ABSTRACT

A connector device of the present disclosure includes a waveguide tube having a coupling portion at a distal end portion and adapted to transmit a high-frequency signal while an open end is arranged in a state contacting or placed close to another waveguide tube having a coupling portion at a distal end portion. Additionally, the coupling portion of the waveguide tube has a metallic tube and a dielectric substance provided inside at least a part of the metallic tube. Furthermore, a communication device of the present disclosure includes the waveguide tube having, at the distal end portion, the coupling portion configured as described above, and the communication device is coupled to another communication device including a waveguide tube and transmits a high-frequency signal thereto in a state where open ends of (Continued)

both of the waveguide tubes contact each other or are located close to each other.

21 Claims, 16 Drawing Sheets

(51) Int. Cl.
*H01P 5/02* (2006.01)
*H04B 7/24* (2006.01)
*H01P 1/04* (2006.01)

(56) References Cited

U.S. PATENT DOCUMENTS

| | | | | |
|---|---|---|---|---|
| 5,136,272 A | * | 8/1992 | Kormann | H01P 1/08 |
| | | | | 156/108 |
| 5,977,841 A | * | 11/1999 | Lee | H01P 1/045 |
| | | | | 333/24 C |
| 9,419,319 B1 | * | 8/2016 | Wollack | H01P 1/042 |
| 9,866,272 B2 | * | 1/2018 | Okada | H04B 1/40 |
| 2015/0270595 A1 | | 9/2015 | Okada | |

FOREIGN PATENT DOCUMENTS

| | | | | |
|---|---|---|---|---|
| JP | H 01-153706 | | 10/1989 | |
| JP | H 10224101 | | 8/1998 | |
| JP | 2006-065700 | | 3/2006 | |
| JP | 2007-228223 | | 9/2007 | |
| JP | 15752937 | * | 9/2009 | ............... H01P 1/04 |
| JP | 2015-177499 | | 10/2015 | |
| WO | WO 2016/147695 | | 9/2016 | |

* cited by examiner

CONNECTOR DEVICE AND COMMUNICATION DEVICE

CROSS REFERENCE TO RELATED APPLICATIONS

This application is a national stage application under 35 U.S.C. 371 and claims the benefit of PCT Application No. PCT/JP2016/072372 having an international filing date of 29 Jul. 2016, which designated the United States, which PCT application claimed the benefit of Japan Patent Application No. 2015-166388 filed 26 Aug. 2015 and Japan Patent Application No. 2016-108493 filed 31 May 2016, the disclosures of each of which are incorporated herein by reference.

TECHNICAL FIELD

The present disclosure relates to a connector device and a communication device.

BACKGROUND ART

There is a communication system in which communication is performed between two communication devices in a state where housings (device bodies) thereof are made to contact each other or be placed close to each other. As an example of such a communication system, it is possible to exemplify a communication system in which one of the two communication devices includes a mobile terminal device and the other includes a radio communication device called a cradle (refer to Patent Document 1, for example).

CITATION LIST

Patent Document

Patent Document 1: Japanese Patent Application Laid-Open No. 2006-65700

SUMMARY OF THE INVENTION

Problems to be Solved by the Invention

In a communication system in which communication is performed between two communication devices in a state where housings (device bodies) thereof are made to contact each other or be placed close to each other, it is important prevent leakage of radio waves to the outside of the housings from the viewpoint of transmission characteristics, interference with other devices, and the like. However, in the communication system according to an example in the related art disclosed in Patent Document 1, radio communication using a slot antenna is performed and there may be a problem that the transmission characteristics are deteriorated because radio waves are easily leaked to the outside the housings. As for this point (problem), it is also apparent from Example 3 of Patent Document 1 that a radio wave absorber is disposed around a housing to prevent leakage of the radio waves.

The present disclosure is directed to providing a connector device and a communication device, in which deterioration of transmission characteristics caused by leakage of radio waves to outside of housings thereof can be suppressed at the time of performing communication between two communication devices in a state where the housings are made to contact each other or be placed close to each other.

Solutions to Problems

A connector device according to the present disclosure in order to achieve the above-described objects includes a waveguide tube having a coupling portion at a distal end portion and adapted to transmit a high-frequency signal while an open end is arranged in a state contacting or placed close to another waveguide tube having a coupling portion at a distal end portion, in which the coupling portion of the waveguide tube includes a metallic tube and a dielectric substance provided inside at least a part of the metallic tube.

A communication device of the present disclosure in order to achieve the above-described objects is a communication device including a waveguide tube having a coupling portion at a distal end portion and adapted to transmit a high-frequency signal while an open end is arranged in a state contacting or placed close to another waveguide tube having a coupling portion at a distal end portion, in which the coupling portion of the waveguide tube includes a metallic tube and a dielectric substance provided inside at least a part of the metallic tube, and the communication device is coupled to another communication device including a waveguide tube, and transmits a high-frequency signal to the other communication device in a state where open ends of both of the waveguide tubes contact each other or are placed closed each other.

Here, the wording "state placed close to each other" represents a state whereby a transmission range of a high-frequency signal can be limited, and typically, and the state corresponds to a state where a distance between the two communication devices (two waveguide tubes) is shorter than a distance between communication devices used for broadcasting or general radio communication. More specifically, the wording "state placed close to each other" herein represents a state where the distance between the two communication devices is 10 [cm] or less, preferably 1 [cm] or less.

In the connector device or communication device thus configured, communication is performed in the state where the open ends of the two waveguide tubes contact each other or are placed close to each other, and therefore, leakage of radio waves to the outside can be more suppressed than in radio communication using a slot antenna.

Effects of the Invention

According to the present disclosure, since leakage of radio waves to the outside can be more suppressed than in the radio communication using a slot antenna, deterioration of transmission characteristics caused by leakage of radio waves can be suppressed.

Note that effects are not limited to those recited herein but may be any one of those recited in the present specification. Additionally, note that the effects described in the present specification are only examples and not limited thereto, and additional effects may also be provided.

MODE FOR CARRYING OUT THE INVENTION

Figure 1:
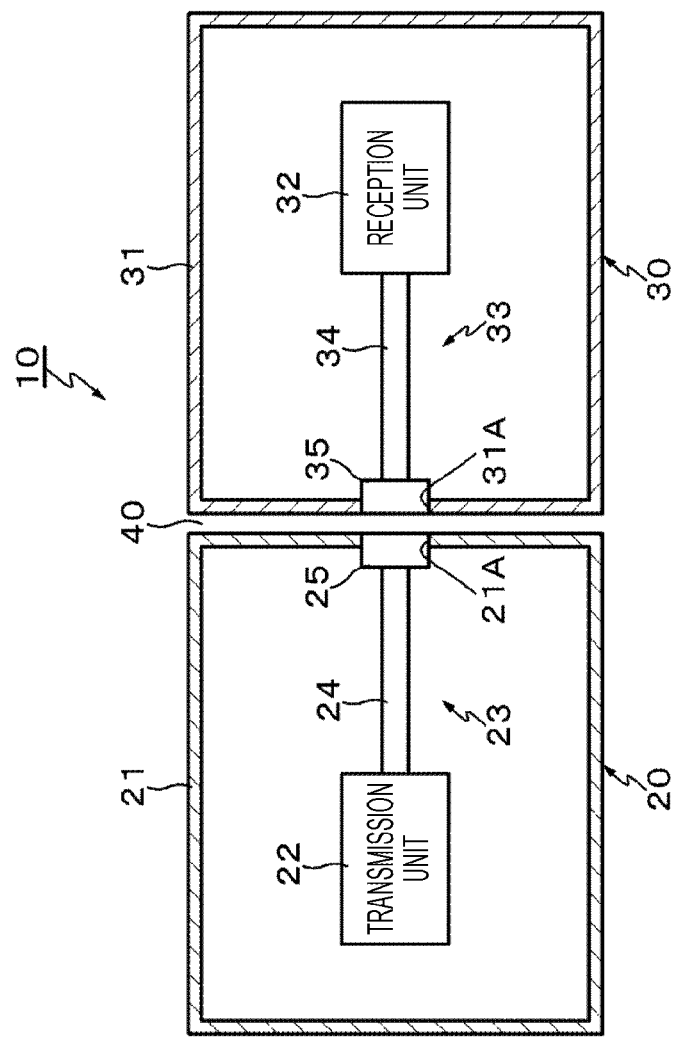
FIG. 1 is a plan view including a partial cross section illustrating an exemplary configuration of a communication system to which the technology of the present disclosure is applied.

In the following, a mode (hereinafter referred to as "embodiment") to implement the technology of the present disclosure will be described in detail with reference to the drawings. The technology of the present disclosure is not limited to the embodiment, and various numerical values, materials and the like in the embodiments are examples. In the following description, a same reference sign will be used for a same element or an element having a same function, and repetition of the same description will be omitted. Note that the description will be provided in the following order.

1. General description of connector device and communication device of present disclosure
2. Communication system to which the technology of the present disclosure is applied
3. Connector device according to one embodiment of the present disclosure
   3-1. Example 1
   3-2. Example 2 (Modified example of Example 1: example in which choke structure is provided only on transmitting side)
   3-3. Example 3 (Modified example of Example 1: example in which choke structure is provided only on receiving side)
   3-4. Example 4 (Modified example of Example 1: example in which choke structure is not filled with dielectric substance)
   3-5. Example 5 (Example in which bi-directional communication can be performed: example where waveguides are arranged side by side)
   3-6. Example 6 (Modified Example of Example 5: example in which waveguides are vertically stacked)
   3-7. Deterioration of transmission characteristics due to positional deviation between two coupling portions or the like
   3-8. Embodiment 7 (Modified example of Example 1: modified example of choke structure)
4. Modified Example
5. Specific examples of communication system <General Description of Connector Device and Communication Device of Present Disclosure>

In a connector device and a communication system of the present disclosure, provided is a configuration in which a signal of high frequency such as an electromagnetic wave, particularly, a microwave, a millimeter wave, a terahertz wave, or the like is used as a signal to perform communication between two communication devices (two waveguide tubes). A communication system using a high-frequency signal is suitable to be used to transmit a signal between various kinds of devices such as an electronic device, an information processing device, and a semiconductor device, transmission of a signal between circuit boards in one device (apparatus), and the like.

In the connector device and the communication device including the preferable configuration described above, preferably, a millimeter-waveband signal is used from among the high-frequency signals as a signal to perform communication between the two communication devices. A millimeter-waveband signal is a radio wave having a frequency of 30 [GHz] to 300 [GHz] (wavelength is 1 [mm] to 10 [mm]). High speed signal transmission in the order of Gbps (for example, 5 [Gbps] or more) can be achieved by performing signal transmission (communication) in the millimeter wave band. For example, a data signal of movie image, a computer image, or the like can be exemplified as a signal required to perform high-speed signal transmission in the order of Gbps. Additionally, signal transmission in the millimeter wave band provides advantages in which excellent interference resistance is obtained and interference with other electrical wiring in cable connection between devices is prevented.

In the connector device and the communication device including the preferable configuration described above, the metallic tube can have an open end surface covered with an insulation layer. Additionally, the insulation layer can include a coating of an insulation material.

Furthermore, in the connector device and the communication device including the preferable configuration described above, a waveguide tube can have a structure in which an inside of the metallic tube is filled with a dielectric substance. Additionally, as the dielectric substance for the waveguide tube, polytetrafluoroethylene, a liquid crystal polymer, a cycloolefin polymer, or polyimide can be used. Furthermore, as the dielectric substance for the coupling portion, polytetrafluoroethylene, a liquid crystal polymer, a cycloolefin polymer, polyimide, polyetheretherketone, polyphenylene sulfide, a thermosetting resin, or an ultraviolet curable resin can be used.

Additionally, in the connector device and the communication device including the preferable configuration described above, the coupling portion of at least one of the two waveguide tubes can have a choke structure around an open end. A depth of a groove of the choke structure is, preferably, ¼ of a wavelength of a high frequency transmitted by the two waveguide tubes. Furthermore, preferably, the groove of the choke structure is filled with a dielectric substance. As the dielectric substance for the choke structure, it is possible to use polytetrafluoroethylene, a liquid crystal polymer, a cycloolefin polymer, polyimide, polyetheretherketone, polyphenylene sulfide, a thermosetting resin, an ultraviolet curable resin, plastic, engineering plastic, or super engineering plastic.

Furthermore, in the connector device and the communication device including the preferable configuration described above, a depth of the groove of the choke structure can be different between in a partial groove portion and in the other partial groove portion. Preferably, two or more partial groove portions are provided. Additionally, the partial groove portion is, preferably, provided in a groove portion along a direction of an electric field generated when the waveguide officialdom transmits a high-frequency signal.

Furthermore, in the connector device and the communication device including the preferable configuration described above, each of the two waveguide tubes can have a rectangular cross-sectional shape. At this point, preferably, a dimension ratio between a long side and a short side of the cross section is 2:1. Alternatively, at least one of the two waveguide tubes can have a quadrate or circular cross-sectional shape. At this point, when at least one of the two waveguide tubes has a quadrate cross-sectional shape, provided is a mode in which bi-directional communication can be performed by a horizontally polarized wave and a vertically polarized wave, and when at least one of the two waveguide tubes has a circular cross-sectional shape, provided is a mode in which bi-directional communication can be performed by a clockwise polarized wave and an anticlockwise polarized wave.

Furthermore, in the connector device and the communication device including the preferable configuration described above, at least one of the two waveguide tubes has a pair of structural bodies each including a transmission path portion and a coupling portion, and can have a structure capable of performing bi-directional communication. At this point, the pair of structural bodies each including a transmission path portion and a coupling portion is, preferably, integrally formed.

<Communication System to Which Technology of Present Disclosure is Applied>

FIG. 1 is a plan view including a partial cross section illustrating an exemplary configuration of a communication system to which the technology of the present disclosure is applied. In a communication system 10 according to the present example, provided is a configuration in which communication is performed via transmission paths of a plurality of systems in a state where housings (device bodies) are made to contact each other or be placed close to each other between different communication devices (devices), specifically, between a first communication device 20 and a second communication device 30. In the present example, the first communication device 20 is a communication device on a transmitting side, and the second communication device 30 is a communication device on a receiving side. Also, each of the first communication device 20 and the second communication device 30 is to be a communication device of the present disclosure.

The first communication device 20 has a configuration in which a transmission unit 22 and a waveguide tube 23 are housed inside a housing 21. Similarly, the second communication device 30 also has a configuration in which a reception unit 32 and a waveguide tube 33 are housed inside a housing 31. Each of the housing 21 of the first communication device 20 and the housing 31 of the second communication device 30 has a square shape, for example, and includes a dielectric substance, for example, a resin having a dielectric constant of 3 and a thickness of about 0.2 [mm], for example. In other words, the housing 21 of the first communication device 20 and the housing 31 of the second communication device 30 are resinous housings. However, the housings 21 and 31 are not limited to be resinous.

The communication system 10 including the first communication device 20 and the second communication device 30 perform communication between both of the communication devices 20, 30, preferably, by using a high-frequency signal such as a millimeter-waveband signal in a state where flat surfaces of the housing 21 and housing 31 are made to contact each other or be placed close to each other. Here, the wording "close to each other" means that the housings are at least placed at positions whereby a transmission range of a millimeter-waveband signal can be limited because the high-frequency signal is the millimeter-waveband signal, and typically, the wording "close to each other" corresponds to a state where a distance between the two communication devices 20, 30 is shorter than a distance between communication devices used for broadcasting or general radio communication. More specifically, the wording "close to each other" represents a state where the distance (interval) between the first communication device 20 and the second communication device 30 is 10 [cm] or less, preferably, 1 or less.

In the first communication device 20, the waveguide tube 23 forming a transmission path portion to transmit a millimeter-waveband signal transmitted from the transmission unit 22 is provided between an output end of the transmission unit 22 and an open portion 21A formed on a wall plate of the housing 21 on the second communication device 30 side. Similarly, in the second communication device 30 also, the waveguide tube 33 forming a transmission path to transmit a received millimeter-waveband signal is provided between an input end of the reception unit 32 and an open portion 31A formed on a wall plate of the housing 31 on the first communication device 20 side.

The waveguide tube 23 on the first communication device 20 side includes: a transmission path portion 24 to transmit a millimeter-waveband signal transmitted from the transmission unit 22; and a coupling portion 25 provided at an end portion of the transmission path portion 24. The coupling portion 25 is provided in a state exposed to one face of the housing 21 through the open portion 21A of the housing 21. At this point, an end surface of an open end of the coupling portion 25 is, preferably, flush with an outer wall surface of the housing 21. The waveguide tube 33 on the second communication device 30 side includes: a transmission path portion 34 to transmit a millimeter-waveband signal to the reception unit 32; and a coupling portion 35 provided at an end portion of the transmission path portion 34. The coupling portion 35 is provided in a state exposed to one face of the housing 31 through the open portion 31A of the housing 31. At this point, an end surface of an open end of the coupling portion 35 is, preferably, flush with an outer wall surface of the housing 31.

The waveguide tube 23 on the first communication device 20 side and the waveguide tube 33 on the second communication device 30 side are arranged in a state where the open end of the coupling portion 25 and the open end of the coupling portion 35 contact each other or are placed close to each other. In the state where the open ends of the coupling portion 25 and coupling portion 35 are placed close to each other, an air layer 40 is interposed between the end surfaces of both open ends and between both outer wall surfaces of the housings 21, 31 as illustrated in FIG. 1.

In the first communication device 20, the transmission unit 22 converts a transmission target signal into a millimeter-waveband signal and performs output processing to the waveguide tube 23. In the second communication device 30, the reception unit 32 receives the millimeter-waveband signal transmitted through the waveguide tube 33, and performs processing to put back (restore) the signal to the original transmission target signal. In the following, the transmission unit 22 and the reception unit 32 will be specifically described.

Figure 2A:
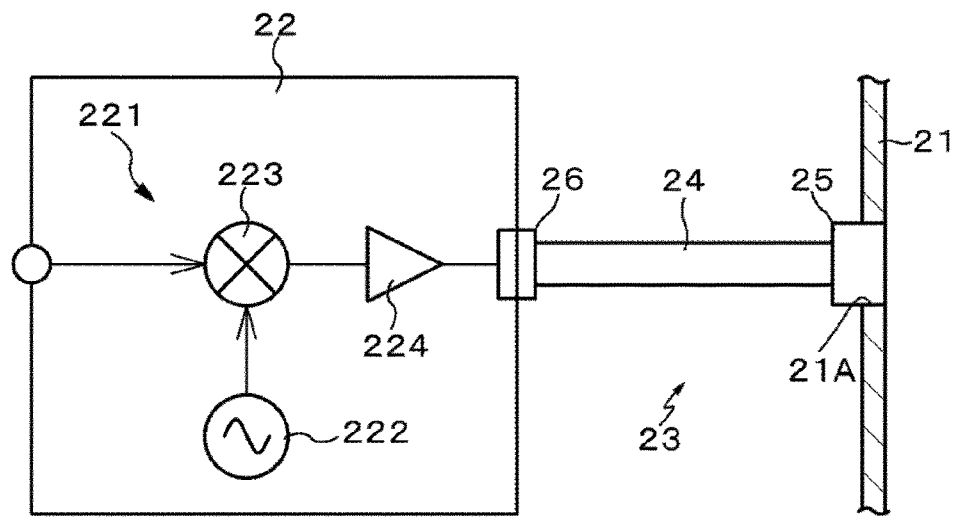
FIG. 2A is a block diagram illustrating an exemplary specific configuration of a transmission unit.
Figure 2B:
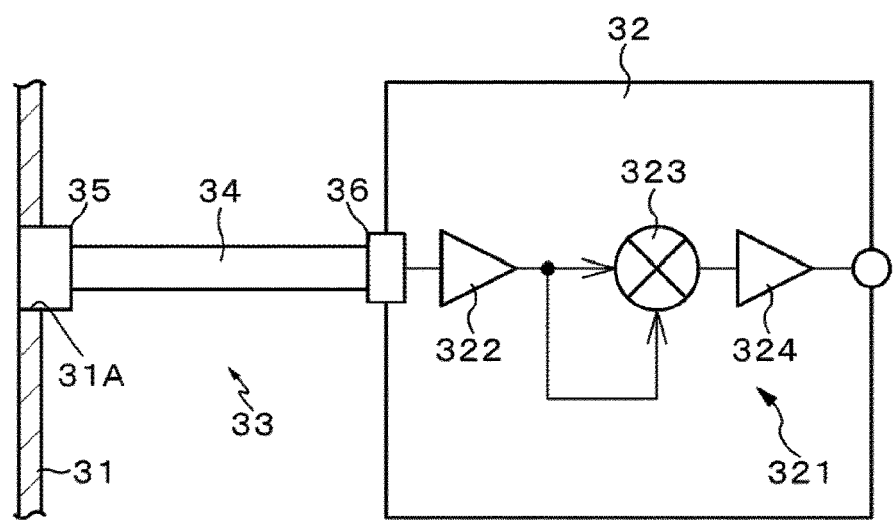
FIG. 2B is a block diagram illustrating an exemplary specific configuration of a reception unit.

FIG. 2A illustrates an exemplary specific configuration of the transmission unit 22, and FIG. 2B illustrates an exemplary specific configuration of the reception unit 32.

In the first communication device 20, the transmission unit 22 has, for example, a signal generation unit 221 to generate a millimeter-waveband signal by processing a transmission target signal. The signal generation unit 221 is a signal conversion unit to convert a transmission target signal into a millimeter-waveband signal, and includes an amplitude shift keying (ASK) modulation circuit, for example. Specifically, the signal generation unit 221 generates a millimeter-waveband ASK-modulated wave by multiplying, in a multiplier 223, the millimeter-waveband signal provided from an oscillator 222 by the transmission target signal, and outputs the ASK-modulated wave via a buffer 224. A connector device 26 is interposed between the transmission unit 22 and the waveguide tube 23. The connector device 26 couples the transmission unit 22 to the waveguide tube 23 by, for example, capacitive coupling, electromagnetic induction coupling, electromagnetic field coupling, resonator coupling, or the like.

In the second communication device 30, the reception unit 32 has, for example, a signal restoration unit 321 to restore an original transmission target signal by processing a millimeter-waveband signal provided through the waveguide tube 33. The signal restoration unit 321 is a signal conversion unit to convert the received millimeter-waveband signal to the original transmission target signal, and includes a square-law (square) detector circuit, for example. Specifically, the signal restoration unit 321 squares, in a multiplier 323, the millimeter-waveband signal (ASK-modulated wave) provided through a buffer 322 to convert the millimeter-waveband signal into the original transmission target signal, and outputs the transmission target signal through the buffer 324. A connector device 36 is interposed between the waveguide tube 33 and the reception unit 32. The connector device 36 couples the waveguide tube 33 to the reception unit 32 by, for example, capacitive coupling, electromagnetic induction coupling, electromagnetic field coupling, resonator coupling, or the like.

As described above, the communication system 10 according to the present embodiment performs communication between the first communication device 20 and the second communication device 30 by using a millimeter-waveband signal in the state where the flat surfaces of the housing 21 and housing 31 (both of the housings) are made to contact each other or be placed close to each other. More specifically, performed is the communication in a state where the open ends of the coupling portions 25 and 35 of the two waveguide tubes 23, 33 contact each other or are close to each other. Therefore, compared to radio communication using a slot antenna, leakage of radio waves to the outside of the waveguide tubes 23, 33 can be suppressed, and therefore, deterioration of transmission characteristics caused by leakage of radio waves can be suppressed. Additionally, compared to the radio communication using a slot antenna, transmission in a broader band can be performed.

Incidentally, there are following advantages in a case where a communication mode is communication using a millimeter-waveband signal as a high-frequency signal, so-called millimeter-wave communication.

a) A larger data rate can be easily taken because a broad communication band can be used in the millimeter-wave communication.

b) A frequency used for transmission can be separated from frequencies for other baseband signal processing, and interference between millimeter waves and the frequencies of baseband signals hardly occurs.

c) A coupling structure and a waveguide structure determined in accordance with a wavelength can be downsized because a wavelength of the millimeter wave band is short. Additionally, electromagnetic shielding can be easily performed because distance attenuation is large and diffraction is small.

d) In normal radio communication, there are strict regulations related to stability of carrier waves in order to prevent interference and the like. In order to achieve carrier waves having such high stability, an external frequency reference component with high stability, a multiplier circuit, a phase locked loop circuit (PLL), and the like are used, and a circuit size is increased. In contrast, in the millimeter-wave communication, leakage to the outside can be easily prevented, and also carrier waves with low stability can be used for transmission, and the circuit size can be suppressed from being increased.

Particularly, in the millimeter-wave communication, provided is the communication system in which the respective transmission paths of the first communication device 20 and the second communication device 30 have the waveguide structures using the waveguide tubes 23, 33, and communication is performed in the state where the first communication device 20 and the second communication device 30 are made to contact each other or be placed close to each other, and therefore, reception of an unnecessary signal from the outside can be suppressed. With this configuration, a complex circuit such as an arithmetic circuit to remove an unnecessary signal when an unnecessary signal is received from the outside is not necessary, and therefore, the first communication device 20 and the second communication device 30 can be downsized by a reduced amount of such a complex circuit.

<Connector Device According to One Embodiment of Present Disclosure>

Subsequently, a configuration of the waveguide tube 23 on the first communication device 20 and a configuration of the waveguide tube 33 on the second communication device 30 side each constituting the connector device according to one embodiment of the present disclosure will be specifically described. The connector device according to the present embodiment includes combination of the waveguide tube 23 and the waveguide tube 33.

[Configuration of Transmission Path Portion]

Figure 3A:
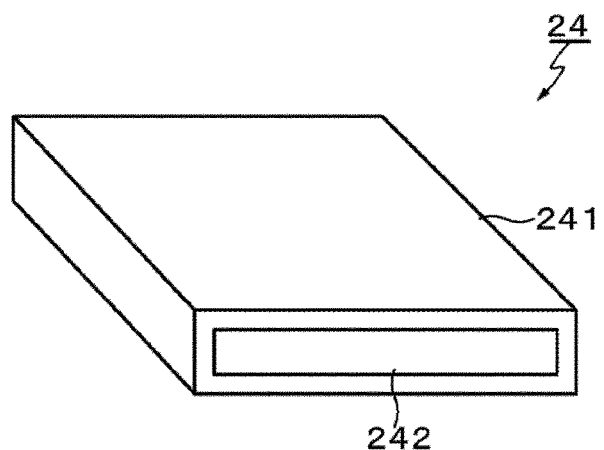
FIG. 3A is a perspective view illustrating an exemplary configuration of a transmission path portion of a waveguide tube.

First, a configuration of the transmission path portion 24 of the waveguide tube 23 on the first communication device 20 side and a configuration of the transmission path portion 34 of the waveguide tube 33 on the second communication device 30 side will be described. Here, the configuration of the transmission path portion 24 of the waveguide tube 23 will be described as a representative, but the similar is applied to the configuration of the transmission path portion 34 of the waveguide tube 33. FIG. 3A illustrates an exemplary configuration of the transmission path portion 24 of the waveguide tube 23.

As illustrated in FIG. 3A, for example, the transmission path portion 24 of the waveguide tube 23 has a square waveguide tube structure in which the inside of a metallic tube 241 having a square cross section is filled with a dielectric substance 242. Here, for example, copper is used as a material of the metallic tube 241, and a liquid crystal polymer (LCP) is used as the dielectric substance 242. More specifically, the transmission path portion 24 according to present example has a flexible waveguide tube cable structure in which an outer periphery of the liquid crystal polymer having the square cross section with a size of, for example, a width 2.5 [mm]×a thickness of 0.2 [mm] is copper-plated, for example.

Here, the dielectric waveguide tube formed by filling the inside of the metallic tube 241 with the dielectric substance 242 is exemplified as the transmission path portion 24, but not limited thereto, the transmission path portion may also be a hollow waveguide tube. Additionally, the square waveguide tube is, preferably, a rectangular waveguide tube in which a dimensional ratio between a long side and a short side in the cross section is 2:1. The square waveguide tube having the dimension ratio of 2:1 provides advantages of preventing occurrence of a higher order mode and capable of performing efficient transmission. However, as the transmission path portion 24, it is not intended to exclude use of a waveguide tube having a cross-sectional shape other than a rectangle, for example, a waveguide tube having a quadrate or circular cross-sectional shape. Additionally, in a case where a thickness of a waveguide tube is thin, for example, in a case where the waveguide tube has a thickness of about 0.2 [mm], a transmission loss per unit length is increased, but there may be cases where the dimensional ratio between the long side and the short side is 10:1 or 15:1.

The liquid crystal polymer used as the dielectric substance 242 to fill the inside of the metallic tube 241 has material characteristics of a low dielectric constant (3.0) and a low dielectric loss tangent (0.002), and therefore, there is an advantage in that a transmission loss at the transmission path portion 24 can be reduced. Generally, in a case where the dielectric loss tangent is small, the transmission loss is low. Also, since the liquid crystal polymer has low water absorbency, there is an advantage in that dimensional stability is excellent even under high humidity. Here, the liquid crystal polymer is exemplified as the dielectric substance 242, but not limited thereto.

Besides the liquid crystal polymer, polytetrafluoroethylene (PTFE), a cyclo-olefin polymer (COP), or polyimide can be also used as the dielectric substance 242. PTFE has material characteristics: a dielectric constant of 2.0 and a dielectric loss tangent of 0.0002. COP has material characteristics: a dielectric constant of 2.3 and a dielectric loss tangent of 0.0002. Polyimide has material characteristics: a relative dielectric constant of 3.5 and a dielectric loss tangent of 0.01.

[Configuration of Coupling Portion]

Next, specific examples of the coupling portion 25 of the waveguide tube 23 on the first communication device 20 side and the coupling portion 35 of the waveguide tube 33 on the second communication device 30 side will be described.

Example 1

Figure 3B:
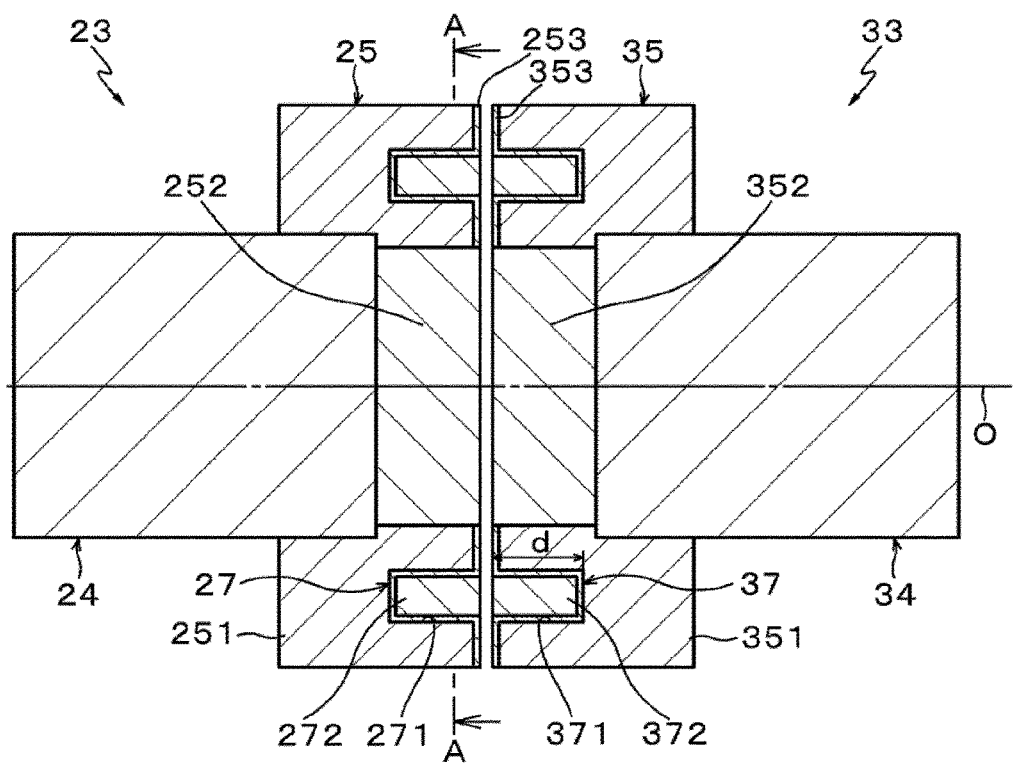
FIG. 3B is a plan sectional view illustrating configurations of respective coupling portions of two waveguide tubes of a connector device according to Example 1.
Figure 4A:
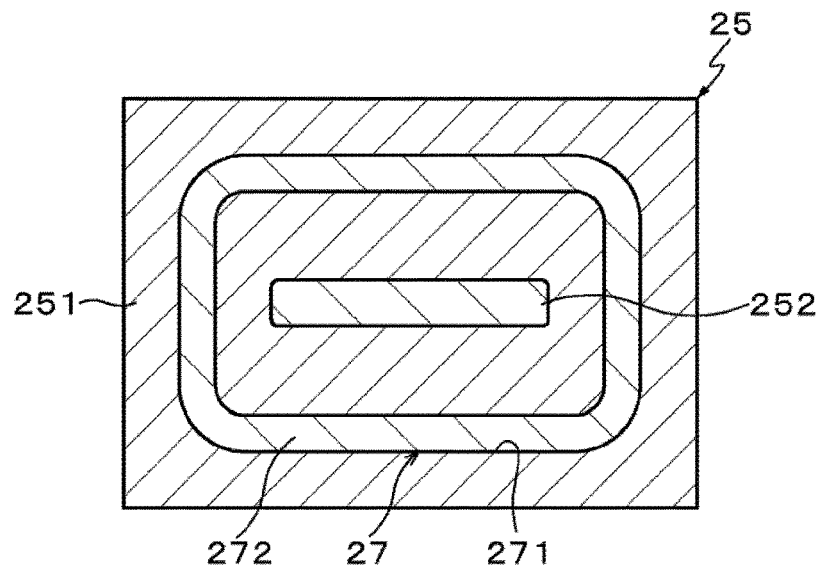
FIG. 4A is a cross-sectional view taken along a line A-A in FIG. 3B.
Figure 4B:
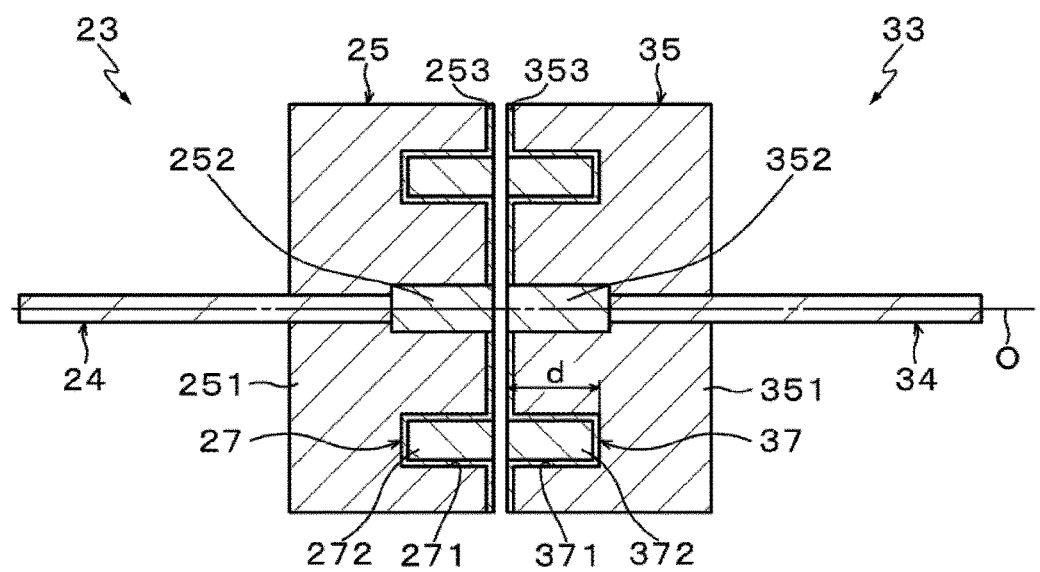
FIG. 4B is a side sectional view illustrating the configurations of the respective coupling portions of the two waveguide tubes of the connector device according to Example 1.

FIG. 3B is a plan sectional view illustrating configurations of respective coupling portions 25, 35 of the two waveguide tubes 23, 33 of the connector device according to Example 1. Additionally, FIG. 4A is a cross-sectional view taken along a line A-A in FIG. 3B, and FIG. 4B illustrates a side sectional view illustrating the respective coupling portions 25, 35 of the two waveguide tubes 23, 33 of the connector device according to Example 1.

The respective coupling portions 25, 35 of the two waveguide tubes 23, 33 have configurations in which the insides of tubes 251, 351 made of a metal such as aluminum is filled with dielectric substances 252, 352, and open end surfaces of the metallic tubes 251, 351 are covered with insulation layers 253, 353. Meanwhile, FIGS. 3B and 4B illustrate the configurations in which the insides of the tubes 251, 351 are entirely filled with the dielectric substances 252, 352, but not necessarily entirely filled with the dielectric substances, and the dielectric substances 252, 352 are only needed to be provided in at least a part of the inside in each of the metallic tubes 251, 351, preferably, at least on the open end portions thereof.

As the dielectric substances 252, 352 with which the insides of the metallic tubes 251, 351 are filled, a material same as the material of the dielectric substance 242 of the transmission path portion 24, specifically, a liquid crystal polymer, PTFE, COP, or polyimide can be used. Additionally, besides these materials, polyether ether ketone (PEEK), polyphenylene sulfide (PPS), a thermosetting resin, or an ultraviolet curable resin can be used as the dielectric substances 252, 352. PEEK has material characteristics: a dielectric constant of 3.3 and a dielectric loss tangent of 0.003. PPS has material characteristics: a dielectric constant of 3.6 and a dielectric loss tangent of 0.001.

The insulation layers 253, 353 covering the open end surfaces of the metallic tubes 251, 351 each includes, for example, a coating of an insulation material. As the insulation coating, for example, anodizing treatment processing that is plating processing exclusively applied to aluminum is preferable. Aluminum conducts electricity, but an alumite coating has an insulation property. Meanwhile, as illustrated in FIGS. 3B and 4B, provided is a configuration in which only the open end surfaces of the metallic tubes 251, 351 are covered with the insulation layers 253, 353, but entire outer surfaces of the tubes 251, 351 and exposed surfaces of the dielectric substances 252, 352 may also be covered.

As described above, the connector device according to the present embodiment adopts the configuration including the two waveguide tubes 23, 33 including the transmission path portions 24, 25 and the coupling portions 25, 35, in which coupling is made in a state that the open ends of the coupling portions 25, 35 contact each other or be placed close to each other. Therefore, leakage of radio waves to the outside can be more suppressed than in the radio communication using a slot antenna. Particularly, the coupling portions 25, 35 have the configurations in which the insides of the metallic tubes 251, 351 are filled with the dielectric substances 252, 352 and the open end surfaces of the metallic tubes 251, 351 are covered with the insulation layers 253, 353. With this structure, there are advantages in which connection reliability can be improved and waterproof can be easily achieved, for example, because the two waveguide tubes 23, 33 have the structures in which no metal is exposed to the contact surface. Incidentally, in a connector device where metals contact each other, there may be problems such as contact defect caused by rust of the connector device, contact wear caused by multiple times of attachment and detachment, deterioration of connection reliability, and difficulty in waterproof.

The coupling portions 25, 35 of the two waveguide tubes 23, 33 have the configurations including choke structures 27, 37 around the open ends of the metallic tubes 251, 351. These choke structures 27, 37 have grooves 271, 371 formed annularly (in present example, in a square annular shape) around center axes O of the waveguide tubes 23, 33 respectively. A depth d in each of the grooves 271, 371 of the choke structures 27, 37 is preferably set to ¼ of a wavelength λ of the high frequency wave (in present example, millimeter wave) transmitted by the waveguide tubes 23, 33, that is, λ/4. Here, "λ/4" means to include not only a case where the depth is strictly λ/4 but also a case where the depth is substantially λ/4, and presence of various kinds of unevenness caused by design or manufacturing is allowed.

In the choke structures 27, 37, when the depth d in each of the grooves 271, 371 is λ/4, an incident wave and a reflected wave generated in each of the grooves 271, 371 become opposite phases in a steady state. Therefore, since the incident wave is canceled by the reflected wave generated in each of the grooves 271, 371, the incident wave does not advance to the outside of the choke structures 27, 37. As a result, leakage of radio waves to the outside can be suppressed by functions of the choke structures 27, 37 in the connector device in which the waveguide tube 23 and the waveguide tube 33 are coupled in the state where the respective open ends thereof are made to contact each other or be placed close to each other.

Here, as for the choke structures 27, 37, the description has been provided for the configurations in which the number of levels of the grooves 271, 371 is one level, but not limited to the one level, the number of levels the grooves may be multiple levels such as two or more levels. In the choke structures 27, 37, the larger the effect to suppress leakage of radio waves to the outside is obtained, the larger the number of levels of the grooves 271, 371 is.

The above-described functions and effects, namely, the functions and effects when the depth d in each of the grooves 271, 371 is λ/4 are obtained in a case where the insides of the grooves 271, 371 of the choke structures 27, 37 are in an empty state. On the other hand, the connector device according to the present example has the configuration in which inner walls of the respective grooves 271, 371 are covered with the insulation layers 253, 353 covering the open end surfaces of the metallic tubes 251, 351, and additionally, the insides thereof are filled with the dielectric substances 272, 372. As the dielectric substances 272, 372 for the choke structures 27, 37, a material same as the dielectric substances 252, 352 with which the metallic tubes 251, 351 are filled, specifically, a liquid crystal polymer, PTFE, COP, polyimide, PEEK, PPS, a thermosetting resin, or an ultraviolet curing resin can be used. Additionally, besides these materials, plastic, engineering plastic, or super engineering plastic can be used as the dielectric substances 272, 372.

Here, in a case of defining that a wavelength of a millimeter wave in the air is $\lambda_0$, a wavelength of a millimeter wave in the dielectric substance is $\lambda_g$, and a dielectric constant of the dielectric substance is $\varepsilon_r$, a relation between the wavelength $\lambda_0$ of the millimeter wave in the air and the wavelength $\lambda_g$ of the millimeter wave in the dielectric substance can be expressed by the following Expression (1).

$$\lambda_g = \lambda_0 / \sqrt{\varepsilon_r} \qquad (1)$$

According to Expression (1), the wavelength can be more shortened in the case where the insides of the grooves 271, 371 are filled with the dielectric substances than in the case where the insides of the grooves 271, 371 are empty in the choke structures 27, 37. Owing to such a wavelength shortening effect obtained by the grooves being filled with the dielectric substances, the depth d in each of the grooves 271, 371 in the connector device according to Example 1 can be set shallower (d<λ/4) than the depth λ/4 in a case where the grooves are not filled with the dielectric substances. With this structure, each of the waveguide tubes 23, 33 can be downsized in a direction along each of the center axes O (refer to FIGS. 3B and 4B).

As described above, the connector device according to Example 1 has the configuration in which the waveguide tubes 23, 33 have the choke structures 27, 37 around the open ends thereof, and therefore, leakage of radio waves to the outside of the waveguide tubes 23, 33 can be more surely suppressed by the functions of the choke structures 27, 37. With this structure, deterioration of the transmission characteristics between the waveguide tube 23 and the waveguide tube 33 caused by leakage of radio waves can be suppressed.

Figure 5:
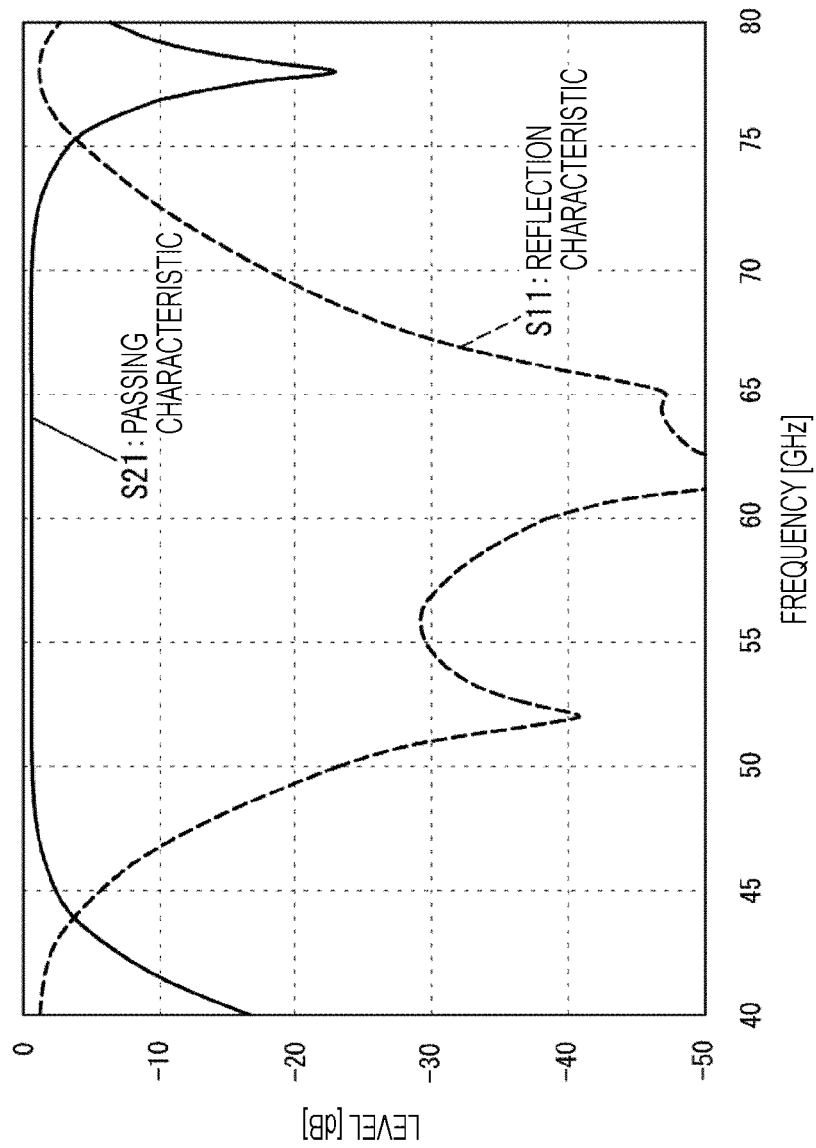
FIG. 5 is a graph illustrating transmission characteristics between the two waveguide tubes of the connector device according to Example 1.

FIG. 5 illustrates the transmission characteristics between the two waveguide tubes 23, 33 of the connector device according to Example 1. In a case of the connector device according to Example 1, for example, when focusing on a −10 [dB] level, a band of a reflection characteristic S11 is broadened to about 47 to 73 [GHz] as it can be grasped from the transmission characteristics in FIG. 5. Additionally, as for a passing characteristic S21, a loss caused by reflection is suppressed, and the characteristic becomes flat as a whole. Therefore, compared to the radio communication using a slot antenna, transmission can be performed in a broader band.

Furthermore, the connector device according to Example 1 adopts the configuration in which the grooves 271, 371 of the choke structures 27, 37 are filled with the dielectric substances 272, 372, and therefore, the depth d in each of the grooves 271, 371 can be designed shallow (d<λ/4) due to the above-described wavelength shortening effect obtained by the grooves being filled with the dielectric substances 272, 372. With this structure, not only miniaturization of the waveguide tubes 23, 33 but also miniaturization of the connector device can be achieved because the grooves 271, 371 in the directions along the center axes O of the waveguide tubes 23, 33 can be downsized by an amount that the depth d is made shallower.

Example 2

Figure 6:
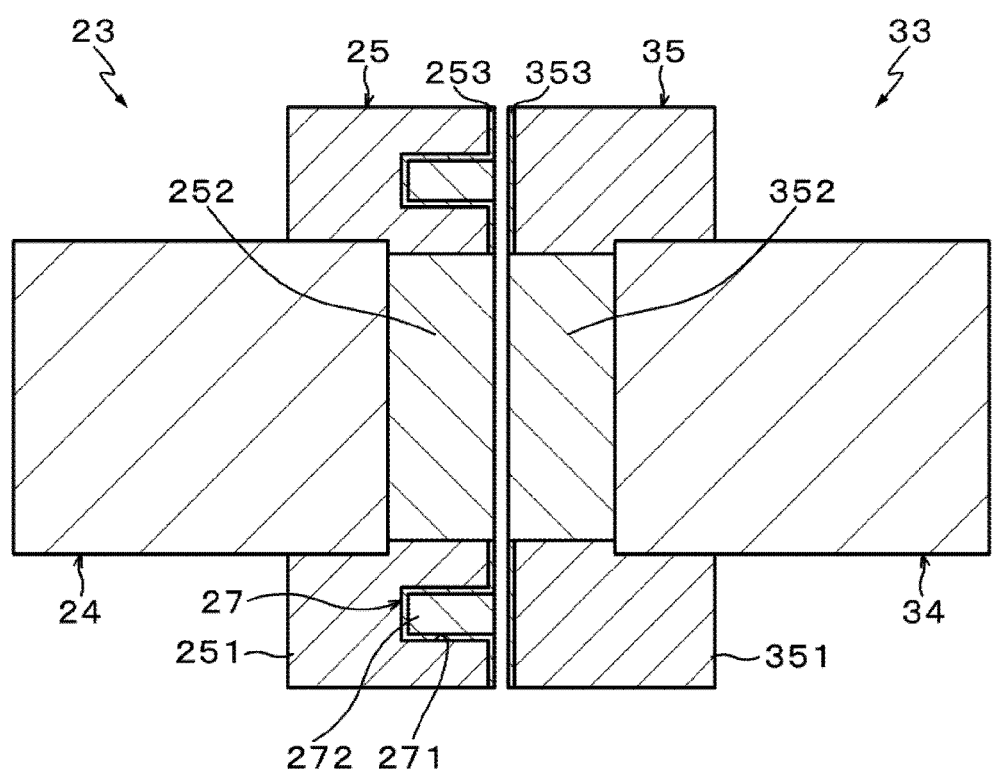
FIG. 6 is a plan sectional view illustrating configurations of respective coupling portions of two waveguide tubes of a connector device according to Example 2.

Example 2 is a modified example of Example 1. FIG. 6 is a plan sectional view illustrating configurations of respective coupling portions of two waveguide tubes of a connector device according to Example 2. In the connector device according to Example 1, adopted is the configuration in which the choke structures 27, 37 are respectively provided on both of the coupling portion 25 of the waveguide tube 23 on the first communication device 20 side and the coupling portion 35 of the waveguide tube 33 on the second communication device 30 side.

In contrast, in the connector device according to Example 2, adopted is a configuration in which a choke structure 27 is provided only in a coupling portion 25 of a waveguide tube 23 on a first communication device 20 side that is a transmitting side. In a case of such a configuration, an effect to suppress leakage of radio waves to the outside is inferior to the effect in the case where the choke structures 27, 37 are provided on both of the transmitting side and the receiving side, but leakage of radio waves can be more suppressed than in a case of not providing any choke structure 27.

Examples 3

Figure 7:
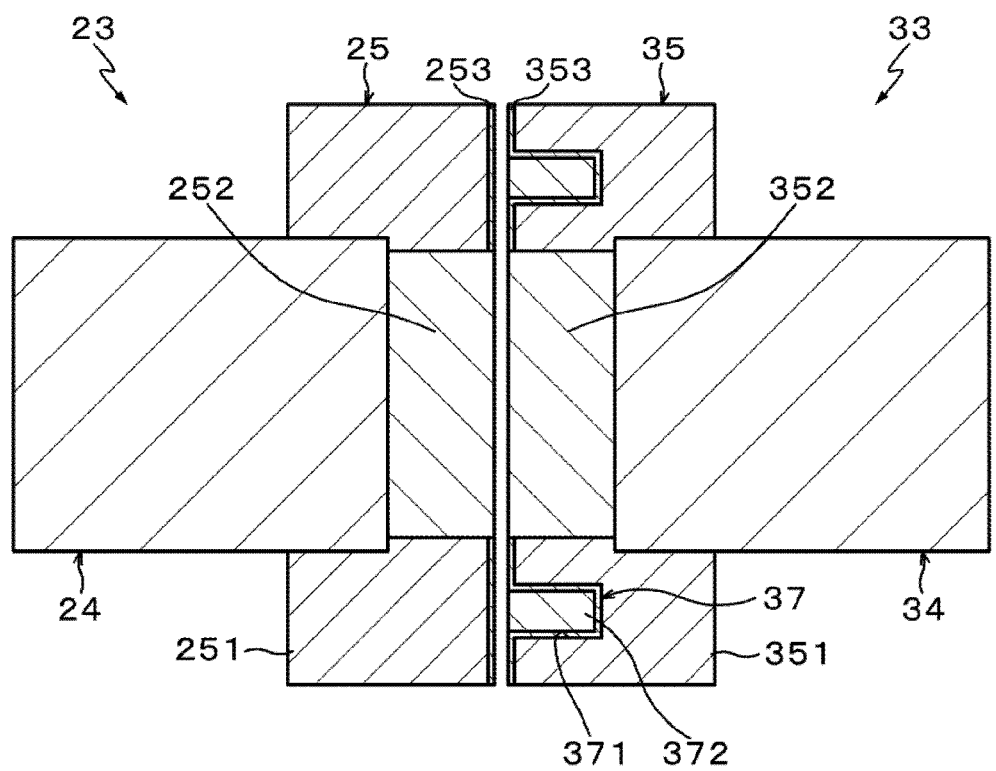
FIG. 7 is a plan sectional view illustrating configurations of respective coupling portions of two waveguide tubes of a connector device according to Example 3.

Example 3 is a modified example of Example 1. FIG. 7 is a plan sectional view illustrating configurations of respective coupling portions of two waveguide tubes of a connector device according to Example 3. In the connector device according to Example 1, adopted is the configuration in which the choke structures 27, 37 are respectively provided on both of the coupling portion 25 of the waveguide tube 23 on the first communication device 20 side and the coupling portion 35 of the waveguide tube 33 on the second communication device 30 side.

In contrast, in the connector device according to Example 3, adopted is a configuration in which a choke structure 37 is provided only in a coupling portion 35 of a waveguide tube 33 on a second communication device 30 side that is a receiving side. In a case of such a configuration, an effect to suppress leakage of radio waves to the outside is inferior to the effect in the case where the choke structures 27, 37 are provided on both of the transmitting side and the receiving side, but leakage of radio waves can be more suppressed than in a case of not providing any choke structure 37.

Example 4

Figure 8:
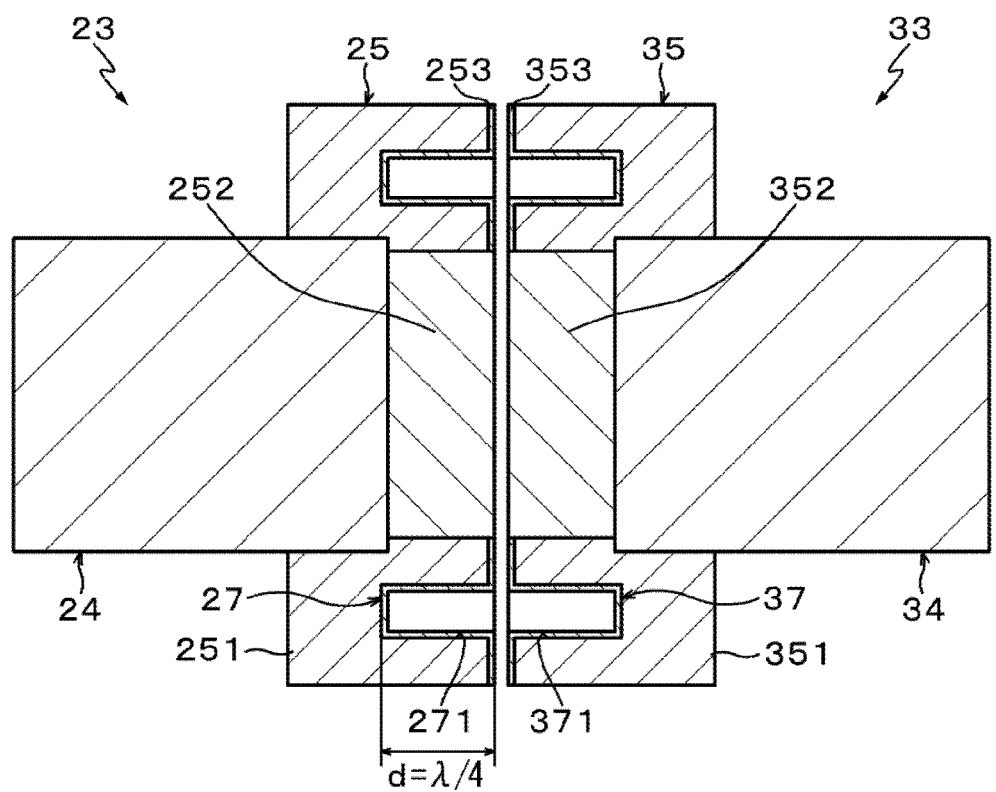
FIG. 8 is a plan sectional view illustrating configurations of respective coupling portions of two waveguide tubes of a connector device according to Example 4.

Example 4 is a modified example of Example 1. FIG. 8 is a plan sectional view illustrating configurations of respective coupling portions of two waveguide tubes of a connector device according to Example 4. In the connector device according to Example 1, adopted is the configuration in which the grooves 271, 371 of the choke structures 27, 37 are filled with the dielectric substances 272, 372.

In contrast, in the connector device according to Example 4, adopted is a configuration in which grooves 271, 371 of choke structures 27, 37 are not filled with dielectric substances 272, 372. In a case of this configuration, the wavelength shortening effect provided by filling the grooves with the dielectric substances 272, 372 cannot be obtained, but the effect to suppress leakage of radio waves to the outside by the choke structures 27, 37 can be obtained. In a case where the grooves 271, 371 are not filled with the dielectric substances 272, 372, a depth d in each of the grooves 271, 371 is preferably set to ¼ of a wavelength 7 of a millimeter wave transmitted by waveguide tubes 23 and 33, that is, $\lambda/4$ With this structure, leakage of radio waves to the outside can be suppressed by the functions of the choke structures 27, 37.

Here, exemplified is the configuration in which both of the grooves 271, 371 of the choke structures 27, 37 of a coupling portion 25 of the waveguide tube 23 on a transmitting side and a coupling portion 35 of the waveguide tube 33 on a receiving side are not filled with dielectric substances, but the configuration is not limited thereto. In other words, it is also possible to adopt a configuration in which only one of the grooves 271, 371 is not filled with the dielectric substance, in other words, only one of the grooves 271, 371 is filled with the dielectric substance.

Example 5

In above-described respective Examples, described is the exemplary case of application to a communication system that performs mono-directional (one-way) communication to transmit a high-frequency signal from the first communication device 20 to the second communication device 30, but application to a communication system that performs bi-directional communication is also possible. A connector device according to Example 5 is a connector device that can be applied to a communication system that performs bi-directional communication.

Figure 9A:
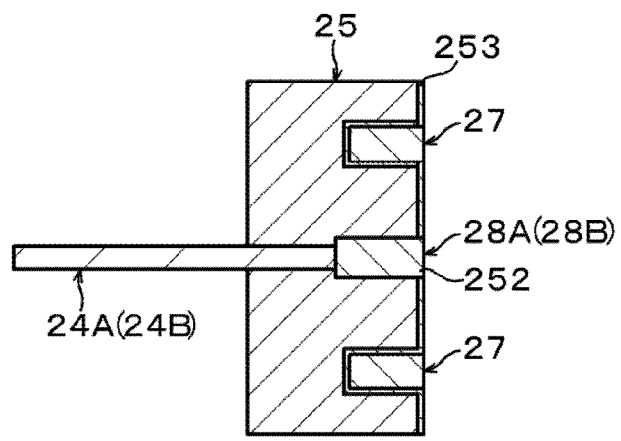
FIG. 9A is a side sectional view illustrating configurations of respective coupling portions of two waveguide tubes of a connector device according to Example 5.
Figure 9B:
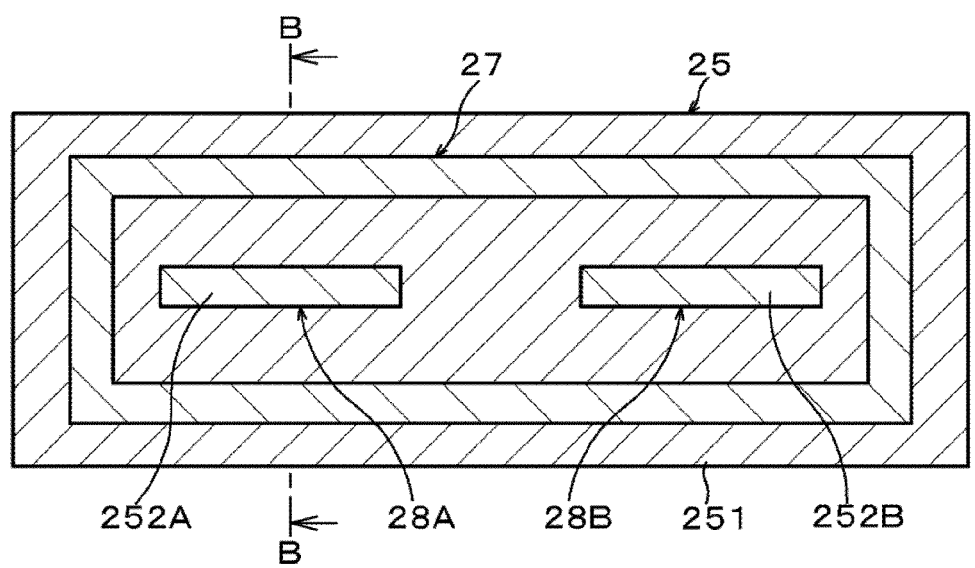
FIG. 9B is a vertical sectional view illustrating the configurations of the respective coupling portions of the two waveguide tubes thereof.

FIG. 9A is a side sectional view (cross-sectional view taken along a line B-B in FIG. 9B) of a coupling portions of two waveguide tubes of a connector device according to Example 5, and FIG. 9B is a vertical sectional view (corresponding to the cross-sectional view taken along a line A-A in FIG. 3B) of the coupling portion in each of the two waveguide tubes.

To achieve bi-directional communication, at least one of a waveguide tube 23 on the first communication device 20 side and a waveguide tube 33 on the second communication device 30 side adopts a configuration described below. Here, a description will be provided by exemplifying a case of the waveguide tube 23. The waveguide tube 23 includes structural bodies including: a pair of transmission path portions 24A, 24B; and a pair of waveguides 28A, 28B constituting a coupling portion 25 by being filled with dielectric substances 252A, 252B. In forming this structural body, integral formation is preferable. A choke structure 27 is formed so as to surround each of the pair of waveguides 28A, 28B.

In the connector device according to Example 5, adopted is the configuration in which the pair of transmission path portions 24A, 24B and the pair of waveguides 28A, 28B are arranged in parallel (namely, side by side) in a width direction of the waveguides 28A, 28B. By thus providing the pair of structural bodies including the transmission path portions 24A, 24B and the waveguides 28A, 28B (in 2 lanes), a communication system capable of performing bi-directional communication can be constructed.

Example 6

Figure 10A:
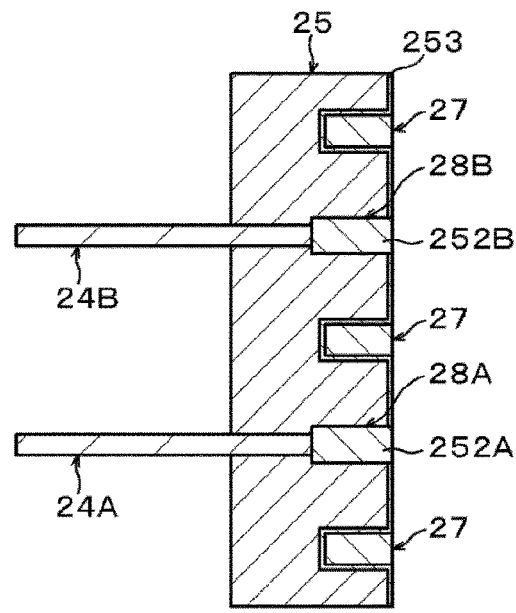
FIG. 10A is a side sectional view illustrating configurations of respective coupling portions of two waveguide tubes of a connector device according to Example 6.
Figure 10B:
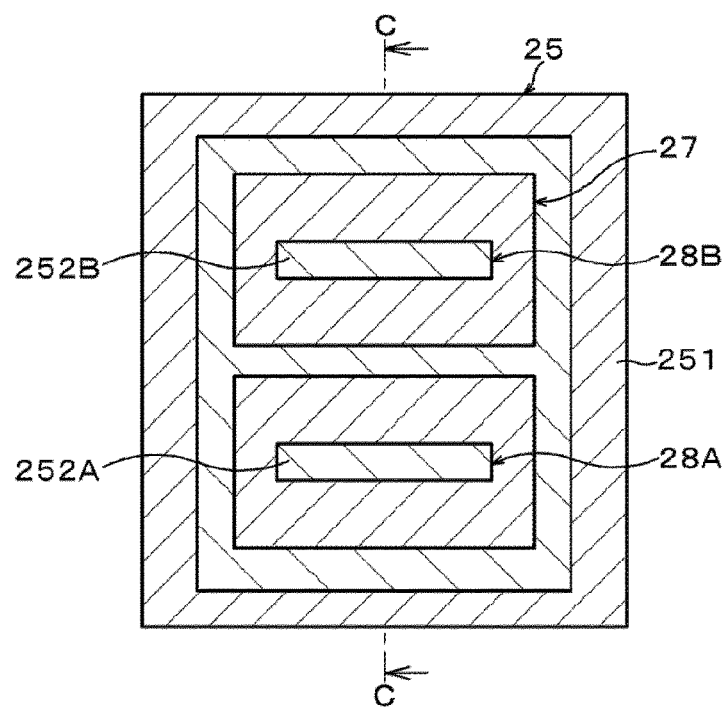
FIG. 10B is a vertical sectional view illustrating the configurations of the respective coupling portions of the two waveguide tubes thereof.

Example 6 is a modified example of Example 5. FIG. 10A is a side sectional view (cross-sectional view taken along a line C-C in FIG. 10B) of a coupling portion in each of two waveguide tubes of a connector device according to Example 5, and FIG. 10B is a vertical sectional view (corresponding to the cross-sectional view taken along the line A-A in FIG. 3B) of the coupling portion in each of the two waveguide tubes.

In the connector device according to Example 5, adopted is the configuration in which the pair of transmission path portions 24A and 24B and the pair of waveguides 28A and 28B to enable bi-directional communication are arranged in parallel in the width direction of the waveguides 28A, 28B. In contrast, in the connector device according to Example 6, adopted is a configuration in which a pair of transmission path portions 24A, 24B and a pair of waveguides 28A, 28B are vertically stacked in a thickness direction of the waveguides 28A, 28B. In FIG. 10A, the pair of transmission path portions 24A, 24B is illustrated in a separated state, but these transmission path portions 24A, 24B are integrally formed, for example, and guided to the transmission unit 11 (refer to FIG. 1).

Thus, the communication system capable of performing bi-directional communication can be constructed in a manner similar to the connector device according to Example 5 even in the connector device according to Example 6 that adopts a configuration in which the pair of transmission path portions 24A, 24B and the pair of waveguides 28A, 28B are vertically stacked.

Figure 11:
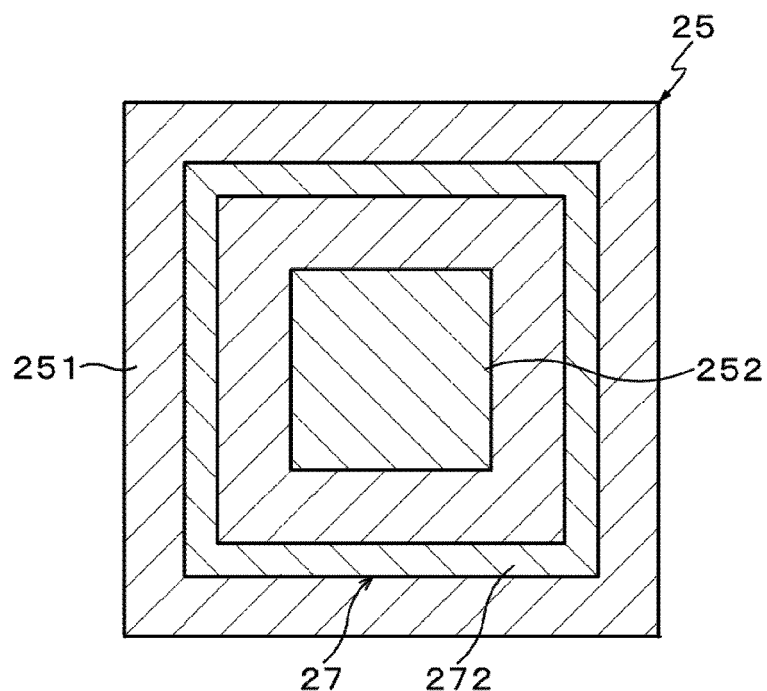
FIG. 11 is a view illustrating a structure of a waveguide tube according to a modified example of Example 5 and Example 6.

Besides Example 5 and Example 6, a communication system capable of performing bi-directional communication can also be constructed by forming a waveguide tube having a quadrate or circular cross-sectional shape in at least one of the two waveguide tubes 23, 33. Specifically, bi-directional communication can be performed by a horizontally polarized wave having a polarization plane horizontal to the earth and a vertically polarized wave having a vertical polarization plane (orthogonal polarized wave) by using a waveguide tube having a quadrate cross-sectional shape as illustrated in FIG. 11 as at least one of the two waveguide tubes 23, 33. In a case of using a waveguide tube having a circular cross-sectional shape, bi-directional communication can be performed by a clockwise polarized wave that turns clockwise in a radio wave advancing direction and an anti-clockwise polarized wave that turns anti-clockwise.

(Deterioration of Transmission Characteristics Caused by Positional Deviation between Two Coupling Portions or the Like)

In the connector devices according to the above-described respective Examples, particularly, in the connector device according to Example 1, the exemplary case where the two coupling portions 25, 35 are aligned to each other has been described, but the center axes O of both are not constantly aligned to each other due to an installation error or the like at the time of installing the coupling portions 25, 25. Furthermore, in a case where a deviation is generated between the center axis O of the coupling portion 25 and the center axis O of the coupling portion 35, there is a concern that transmission characteristics may be deteriorated.

Figure 12A:
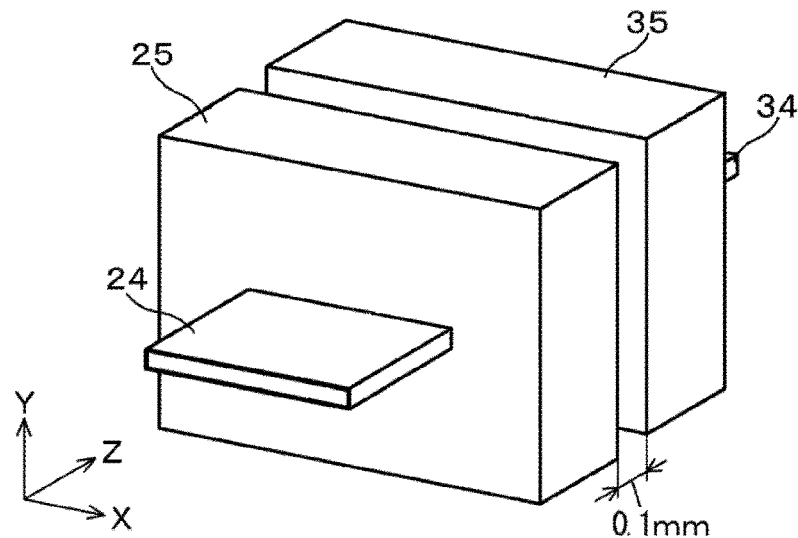
FIG. 12A is a perspective view illustrating a case where there is a deviation between respective center axes of the two coupling portions and a gap exists between the respective coupling portions in the connector device according to Example 1.
Figure 12B:
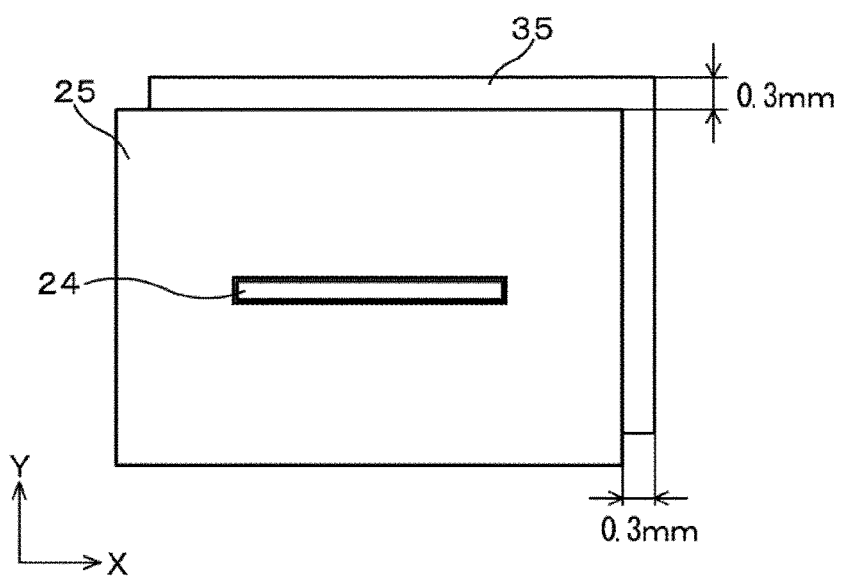
FIG. 12B is a front view of FIG. 12A.

Here, in the connector device according to Example 1, study will be made on transmission characteristics in a case where the center axis O of the coupling portion 35 is deviated from the center axis O of the coupling portion 25 by 0.3 mm in an X direction and 0.3 mm in a Y direction and there is a gap of 0.1 mm in a Z direction as illustrated in FIGS. 12A and 12B. The transmission characteristics between the two waveguide tubes 23, 33 in this case are illustrated in FIG. 13.

Figure 13:
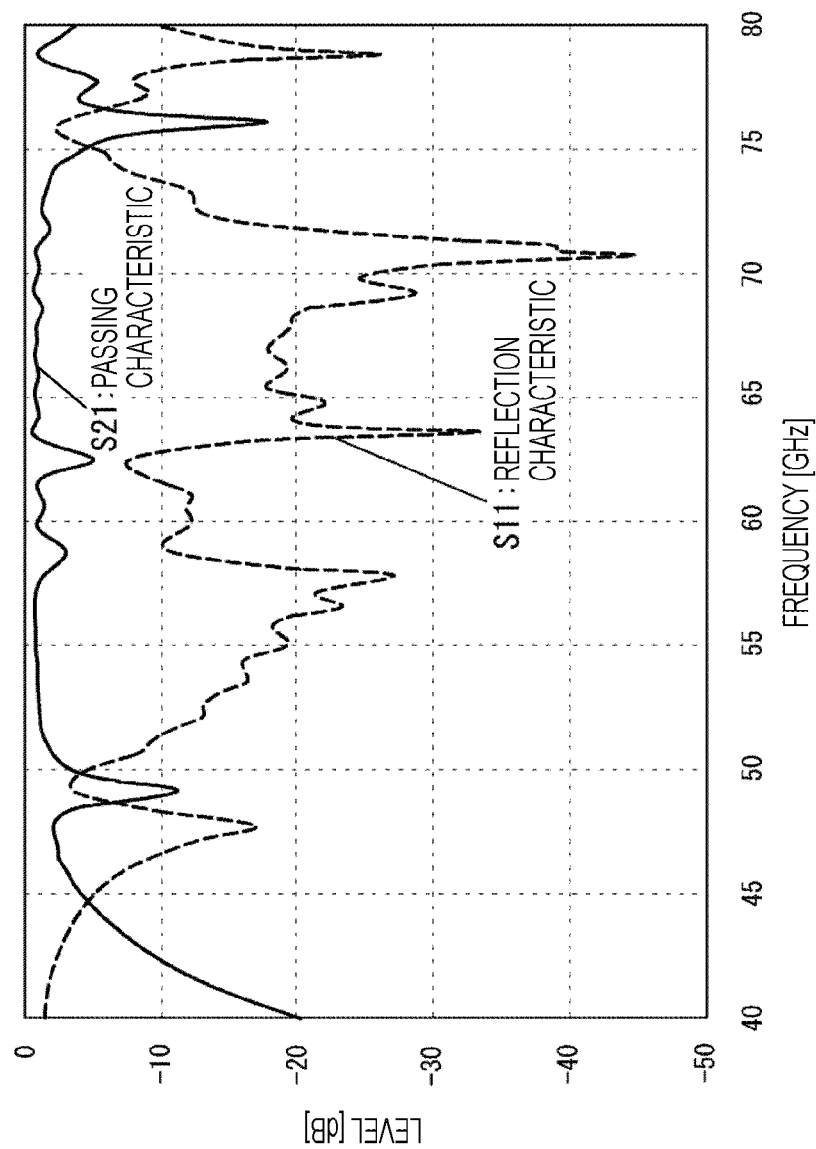
FIG. 13 is a graph illustrating transmission characteristics in a case where there is a deviation between the respective center axes of the two coupling portions and a gap exists between the respective coupling portions in the connector device according to Example 1.

As it can be grasped from the transmission characteristics illustrated in FIG. 13, in the event of having the above-described positional deviation and gap between the two coupling portions 25, 35, a dip point is generated in the vicinity of a center portion (60 GHz) of a flat band (approximately 50 GHz to 70 GHz) of the passing characteristic S21 illustrated in FIG. 5, and the transmission characteristics are deteriorated. It can be considered that the deterioration is caused by the following reason. In other words, when the center axes O are deviated from each other, a large amount of radio waves emitted from the coupling portion 25 (35) enter the groove 371 (271) of the choke structure 37 (27) of the coupling portion 35 (25) and a resonance state occurs at a frequency $f_1$ due to a wavelength circling around the groove 371 (271), and as a result, the dip point of the passing characteristic S21 is induced.

Example 7

Example 7 is a modified example of Example 1, specifically, a modified example of the choke structures 27, 37 in the connector device according to Example 1. Here, the choke structure 27 on a coupling portion 25 side will be described, but the similar is applied to the choke structure 37 on a coupling portion 35 side.

Figure 14A:
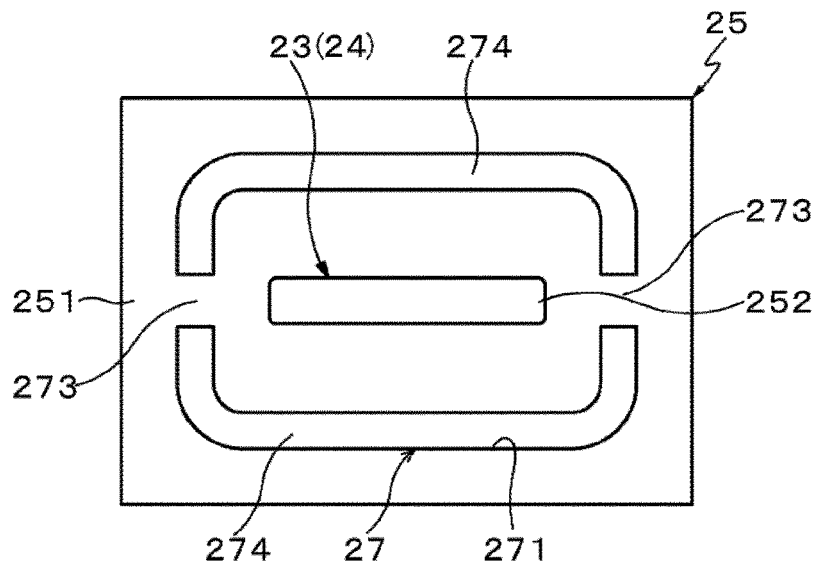
FIG. 14A is a front view illustrating an exemplary configuration of a choke structure of a connector device according to Example 7.

In Example 7, provided is a configuration in which a depth of a groove 271 is set different between in a partial groove portion 273 and in the other partial groove portion 274 in the choke structure 27 on the coupling portion 25 side as illustrated in FIG. 14A in order to maintain favorable transmission characteristics even when there is a positional deviation between the two coupling portions 25, 35, or the like. The depth of the groove 271 is a depth from an open end surface of the coupling portion 25.

Specifically, the partial groove portion 273 is formed to have a depth different from the depth d of the other partial groove portion 274. In other words, the partial groove portion 273 may be shallower or may be deeper than the depth d of the other partial groove portion 274, and the depth range thereof is "0 to (d+α)". A bottom surface of the other partial groove portion 274 is a bottom surface of the groove 271. In a case of an exemplary configuration of the choke structure 27 illustrated in FIG. 14A, the depth of the partial groove portion 273 is zero, that is, a height same as the open end surface of the coupling portion 25.

In the example of FIG. 14A, the partial groove portion 273 is integrally formed with the coupling portion 25 by leaving a part thereof at the time of ditching (forming) the groove 271 at the open end surface of the coupling portion 25. In other words, the partial groove portion 273 includes a material same as that of the coupling portion 25, and has conductivity. With this structure, the partial groove portion 273 functions to block propagation of radio waves which have been emitted from the coupling portion 35 and entered the groove 271 of the choke structure 27.

Two or more partial groove portions 273, in the present example, two thereof are provided on short sides of the groove 271 formed in a rectangular annular shape, that is, a left side and a right side of the drawing. The short sides of the groove 271 are also short sides of the waveguide tube 23 (transmission path portion 24). In a case of transmitting a high-frequency signal by the waveguide tube 23, generally adopted is a transmission mode in which an electric field is generated in a direction along the short side of the waveguide tube 23. Therefore, the partial groove portion 273 is provided in a groove portion along a direction of the electric field generated when the waveguide officialdom 23 transmits a high-frequency signal, that is, in the groove portion on each of the short sides of the waveguide tube 23.

As described above, for example, the two partial groove portions 273 having the depth different from that of the other partial groove portion 274 are provided on each of the short sides of the rectangular annular groove 271 in the choke structure 27, and therefore, the transmission characteristics can be favorably maintained by the functions of the partial groove portions 273 even in the event of positional deviation between the two coupling portions 25, 35, or the like. The function of the partial groove portion 273 will be described below.

Figure 15:
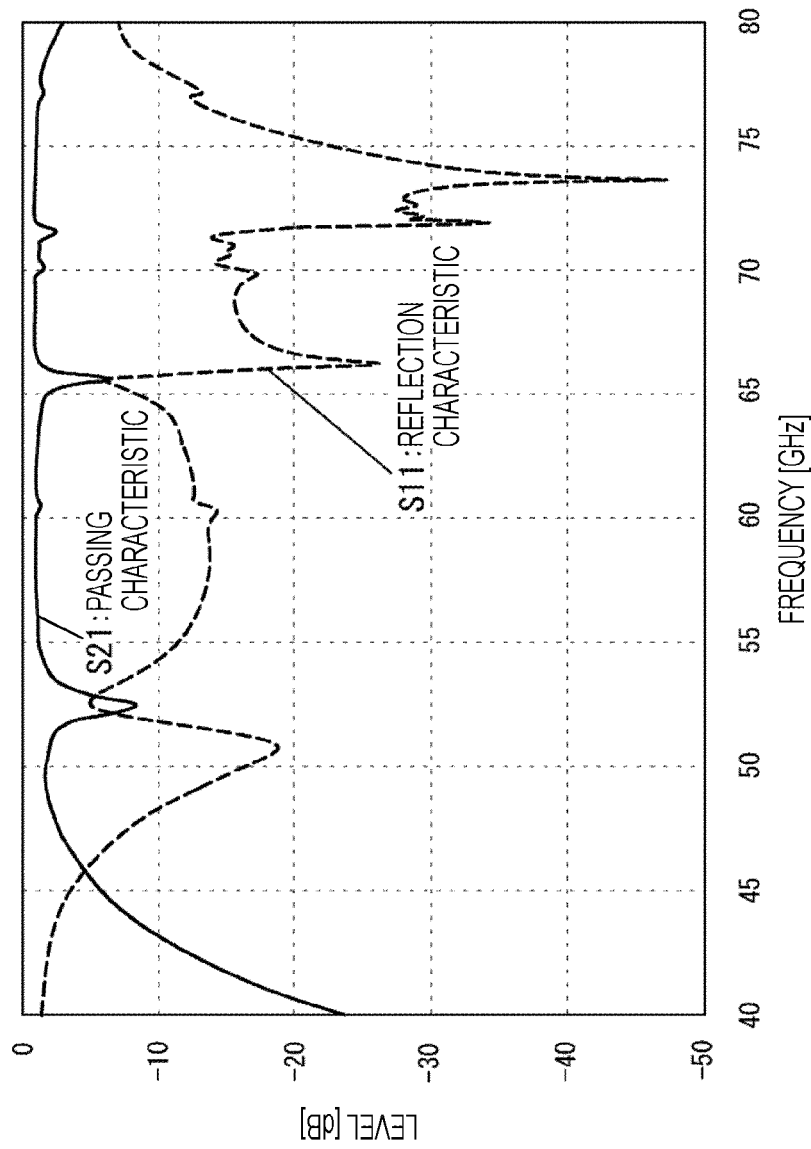
FIG. 15 is a graph illustrating transmission characteristics between two waveguide tubes of the connector device according to Example 7.

FIG. 15 illustrates transmission characteristics in a case of the choke structure 27 according to Example 7 when the center axis O of the coupling portion 35 is deviated from the center axis O of the coupling portion 25 by 0.3 mm in the X direction and 0.3 mm in the Y direction and the gap of 0.1 mm in the Z direction is provided as illustrated in FIGS. 12A and 12B. As it can be grasped from FIG. 15, in the choke structure 27 according to Example 7, a dip point of the passing characteristic S21 can be shifted to a frequency far from the vicinity of the center portion (60 GHz) of the flat band.

The reason is described below. In other words, for example, since the two partial groove portions 273 each having the depth different from the depth of the other partial groove portion 274 are provided on the short sides of the rectangular annular groove 271, a circumferential length of the groove 271 becomes ½ to propagate radio waves having entered the groove 271 of the choke structure 27. Due to this, the dip point can be shifted to a frequency band higher than the center portion (60 GHz) of the transmission band because a resonance frequency caused by the choke structure 27 according to Example 7 becomes $2 \times f_1$ relative to a resonance frequency $f_1$ caused by the wavelength circling the groove 271.

Figure 14B:
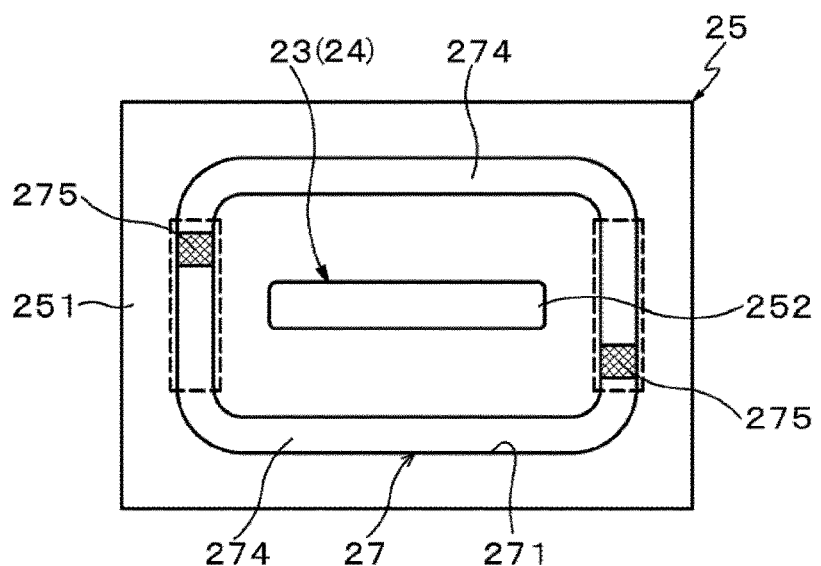
FIG. 14B is a front view illustrating an exemplary configuration of the choke structure of the connector device according to Example 7

In the example of FIG. 14A, it has been described that the partial groove portion 273 is integrally formed with the coupling portion 25 by leaving a part thereof at the time of ditching (forming) the groove 271 at the open end surface of the coupling portion 25, but a forming method of the partial groove portion 273 is not limited thereto. For example, as illustrated in FIG. 14B, the groove 271 is formed at the open end surface of the coupling portion 25 and then a conductive member 275 may be embedded inside the groove 271 as the partial groove portion 273.

In this case also, two or more conductive members 275 are provided on the short sides of the rectangular annular groove 271, that is, the short sides on the left side and the right side in the drawing in a manner similar to the partial groove portions 273. In a case of providing the conductive members 275, it is not necessary to be symmetric or rotationally symmetric. The effect of the choke structure 27, that is, the effect to suppress leakage of radio waves to the outside is stronger in a direction cutting the electric field (long side direction of the groove 271). However, in a case of providing the conductive partial groove portions 273 on the long sides of the groove 271, the effect is significantly degraded.

In a case of providing the conductive members 275 on the short sides of the groove 271, the effect of the choke structure 27 is hardly prevented. From this viewpoint, the conductive members 275 are provided on, preferably, the short sides of the groove 271. However, in a case where a length in the short side direction of the conductive member 275 is gradually increased, the effect of the choke structure 27 is gradually degraded, and therefore, the length is preferably kept within a region surrounded by a broken line in FIG. 14B, that is, within linear regions on the short sides. Furthermore, as for a depth range of the conductive member 275 inside the groove 271 is set to "0 to (d+α)" in a manner similar to the case of the partial groove portion 273 in the example of FIG. 14A.

In a case where the two conductive members 275 are thus provided on the short sides of the rectangular annular groove 271 also, the functions and effects similar to the case of the partial groove portions 273 in the example of FIG. 14A can be obtained. In other words, even in a case where there is a positional deviation or the like between the two coupling portions 25, 35, the transmission characteristic can be favorably maintained by the function of the conductive member 275 in a manner similar to the partial groove portion 273. Consequently, an installation error or the like at the time of installing the two coupling portions 25, 25 can be allowed to some extent, and therefore, installation freedom can be increased.

Modified Example

While the preferred embodiment of the present disclosure has been described above, the technology of the present disclosure is not limited to the above-described embodiment, and various modifications or improvements can be made to the above-described embodiment within the scope of the gist of the present disclosure described in the claims.

For example, in the above embodiment, as illustrated in FIG. 1, provided is the configuration in which the waveguide tube 23 on the first communication device 20 side and the waveguide tube 33 on the second communication device 30 side have the transmission path portions 24 and the transmission path portion 34 each having a predetermined length. However, the length in each of the transmission path portion 24 and transmission path portion 34 is arbitrary, and there may be a case where the length thereof is zero, that is, the transmission path portion 24 and the transmission path portion 34 does not exist. Even in this case, a part of the waveguide included in the coupling portion 25 and located on an input side also serves as the transmission path portion 24, and a part of the waveguide included in the coupling portion 35 and located on an output side also serves as the transmission path portion 34.

Note that the transmission path portion 24 and the transmission path portion 34 can be also deemed as waveguide tubes having a coupling portion 25 and a coupling portion 35 at distal end portions. In this case, the connector device of the present invention is a connector device including the waveguide tube (24/34) having a coupling portion (25/35) at a distal end portion thereof, and transmits a high-frequency signal by placing an open end thereof in a state contacting or placed close to the other waveguide tube having a coupling portion at a distal end portion.

Furthermore, in the above embodiment, the technology of the present disclosure is applied to the communication system 10 including the first communication device 20 and the second communication device 30, but the technology of the present disclosure is also applicable to a communication device on the transmitting side or the receiving side, namely, the first communication device 20 or the second communication device 30. In this case, the communication device of the present disclosure has a configuration including a connector device in which the coupling portion 25/35 of the waveguide tube 23/33 has at least an open end portion of the metallic tube 251/351 provided with a dielectric substance 252/352, and an open end surface of the tube 251/351 is covered with the insulation layer 253/353. Then, a high-frequency signal is transmitted to the other communication device (communication device 20/30) having a waveguide tube in a state where the open ends of the waveguide tubes contact or are placed close to each other.

Figure 16:
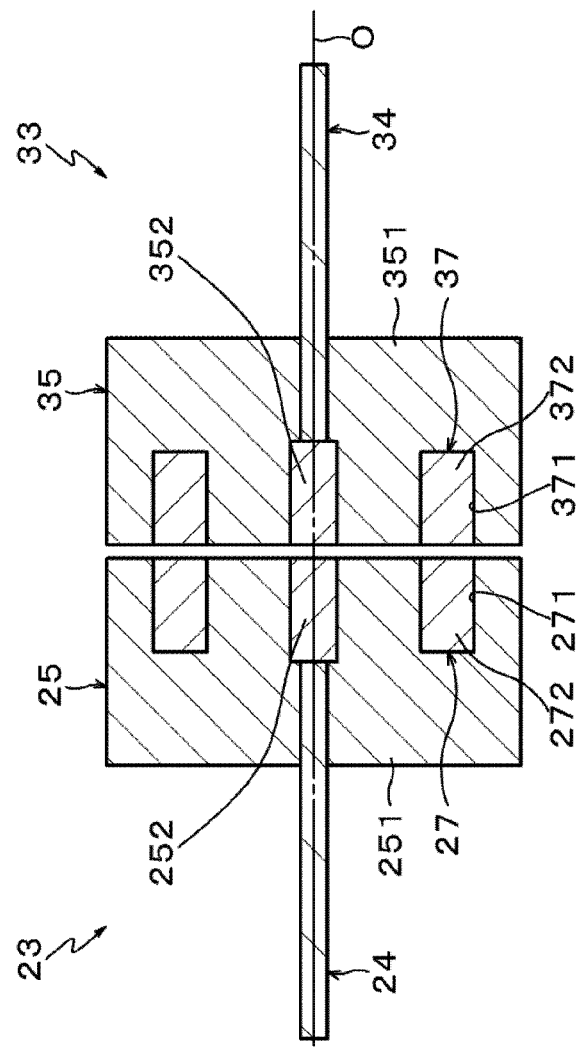
FIG. 16 is a side sectional view illustrating other configurations of the respective coupling portions of the two waveguide tubes of the connector device according to Example 1.

Additionally, in the connector device according to Example 1, the open end surfaces of the metallic tubes 251, 351 are covered with the insulation layers 253, 353, but it is not constantly necessary to cover the open end surfaces with the insulation layers 253, 353. In other words, as illustrated in FIG. 16, the open end surfaces of the metallic tubes 251, 351 may not be covered with the insulation layers 253, 353. Even in a case of this configuration, the open ends of the two coupling portions 25, 35 are also coupled in a state of contacting each other or placed close to each other although the functions and effects by the insulation layers 253, 353 cannot be obtained, and therefore, the effect to suppress leakage of radio waves to the outside can be obtained.

<Specific Example of Communication System>

As a combination of the first communication device 20 and the second communication device 30, following combinations can be considered. However, the combinations exemplified below are merely examples and it is not limited to these combinations. Note that a transmission system of a signal between the first communication device 20 and the second communication device 30 may be a mono-directional (one-way) transmission system or a bi-directional transmission system.

In a case where the second communication device 30 is a battery-driven device such as a mobile phone, a digital camera, a video camera, a game machine, and a remote controller, a combination with the first communication device 20 that is a device such as a battery charger or a device, a so-called base station to perform image processing can be considered. Also, in a case where the second communication device 30 is a device having an appearance like a relatively thin IC card, a combination with the first communication device 20 that is a card reader/writer can be considered. The card reader/writer is further used in combination with an electronic apparatus main body such as a digital recording/reproducing device, a terrestrial television receiver, a mobile phone, a game machine, and a computer.

Furthermore, a combination of a mobile terminal device with a cradle is also possible. The cradle is a stand type extension device to perform electric charge, data transfer, or extension for a mobile terminal device. In the communication system having the system configuration illustrated in FIG. 1, the first communication device 20 including the transmission unit 22 to transmit a millimeter-waveband signal and the waveguide tube 23 having the transmission path portion 24 and the coupling portion 25 serves as the cradle. Additionally, the second communication device 30 including the reception unit 32 to receive a millimeter-waveband signal and the waveguide tube 33 having the transmission path portion 34 and the coupling portion 35 serves as the portable terminal device.

Furthermore, the present disclosure can also have following configurations.

[1] A connector device including a waveguide tube having a coupling portion at a distal end portion and adapted to transmit a high-frequency signal while an open end is arranged in a state contacting or placed close to the other waveguide tube having a coupling portion at a distal end portion, in which the coupling portion of the waveguide tube includes a metallic tube and a dielectric substance provided inside at least a part of the metallic tube.

[2] The connector device recited in [1] above, in which the metallic tube has an open end surface covered with an insulation layer.

[3] The connector device recited in [2] above, in which the insulation layer of the coupling portion includes a coating of an insulation material.

[4] The connector device recited in any one of [1] to [3] above, in which the waveguide tube has a structure in which an inside is filled with a dielectric substance.

[5] The connector device recited in [4] above, in which the dielectric substance for the waveguide tube is polytetrafluoroethylene, a liquid crystal polymer, a cycloolefin polymer, or polyimide.

[6] The connector device recited in [4] above, in which a dielectric substance for the coupling portion is polytetrafluoroethylene, a liquid crystal polymer, a cycloolefin polymer, polyimide, polyether ether ketone, polyphenylene sulfide, a thermosetting resin, or an ultraviolet curing resin.

[7] The connector device recited in any one of [1] to [6] above, in which the coupling portion of the waveguide tube has a choke structure around the open end.

[8] The connector device recited in [7] above, in which a depth of a groove of the choke structure is ¼ of a wavelength of a high frequency transmitted by the two waveguide tubes.

[9] The connector device recited in [7] above, in which the groove of the choke structure is filled with the dielectric substance.

[10] The connector device recited in [9] above, in which the dielectric substance for the choke structure is polytetrafluoroethylene, a liquid crystal polymer, a cycloolefin polymer, polyimide, polyether ether ketone, polyphenylene sulfide, a thermosetting resin, an ultraviolet curing resin, plastic, engineering plastic, or super engineering plastic.

[11] The connector device recited in any one of [7] to [10] above, in which a depth of the groove of the choke structure is different between in a partial groove portion and in the other partial groove portion.

[12] The connector device recited in [11] above, in which two or more partial groove portions are provided.

[13] The connector recited in [11] or [12] above, in which the partial groove portion is provided in a groove portion along a direction of an electric field generated when the waveguide officialdom transmits a high-frequency signal.

[14] The connector device recited in any one of [1] to [13] above, in which the waveguide tube has a rectangular cross-sectional shape.

[15] The connector device recited in [14] above, in which a dimensional ratio between a long side and a short side of the cross section of the waveguide tube is 2:1.

[16] The connector device recited in [15] above, in which the waveguide tube has a pair of structural bodies each including a transmission path portion and a coupling portion, and has a structure capable of performing bi-directional communication.

[17] The connector device recited in [16] above, in which the pair of structural bodies is integrally formed.

[18] The connector device recited in any one of [1] to [17] above, in which the waveguide tube has a quadrate or circular cross-sectional shape.

[19] The connector device recited in [18] above, in which when the waveguide tube has a quadrate cross-sectional shape, bi-directional communication by a horizontally polarized wave and a vertically polarized wave can be performed, and when the waveguide tube has a circular cross-sectional shape, bi-directional communication by a clockwise polarized wave and an anti-clockwise polarized wave can be performed.

[20] The connector device recited in any one of [1] to [19] above, in which the high-frequency signal is a millimeter-waveband signal.

[21] A communication device including a waveguide tube having a coupling portion at a distal end portion and adapted to transmit a high-frequency signal while an open end is arranged in a state contacting or placed close to the other waveguide tube having a coupling portion at a distal end portion, in which the coupling portion of the waveguide tube includes a metallic tube and a dielectric substance provided inside at least a part of the metallic tube, and the communication device is coupled to the other communication device including a waveguide tube, and transmits a high-frequency signal to the other communication device in a state where open ends of both of the waveguide tubes contact each other or are placed close to each other.

[22] The communication device recited in [21] above, in which the high-frequency signal is a millimeter-waveband signal.

REFERENCE SIGNS LIST

10 Communication system
20 First communication device
21, 31 Housing
22 Transmission unit
23, 33 Waveguide tube
24, 34 Transmission path portion
25, 35 Coupling portion
26, 36 Connector device
27, 37 Choke structure
28A, 28B Waveguide
30 Second communication device
32 Reception unit
221 Signal generation unit (signal conversion unit)
222 Oscillator
223, 323 Multiplier
224, 322, 324 Buffer
242, 252, 352, 272, 372 Dielectric substance
251, 351 Metallic tube
253, 353 Insulation layer
321 Signal restoration unit (signal conversion unit)

What is claimed is:

1. A connector device comprising a waveguide tube having a coupling portion at a distal end portion and configured to transmit a high-frequency signal while an open end of the coupling portion is arranged in a state contacting or placed close to another waveguide tube having a coupling portion at a distal end portion,
   wherein the coupling portion of the waveguide tube includes a metallic tube and a dielectric substance provided inside at least a part of the metallic tube, and wherein the metallic tube has an open end surface covered with an insulation layer.

2. The connector device according to claim 1, wherein the insulation layer includes a coating of an insulation material.

3. The connector device according to claim 1, wherein the waveguide tube has a structure in which an inside is filled with a dielectric substance.

4. The connector device according to claim 3, wherein the dielectric substance for the waveguide tube is polytetrafluoroethylene, a liquid crystal polymer, a cycloolefin polymer, or polyimide.

5. The connector device according to claim 3, wherein the dielectric substance for the coupling portion is polytetrafluoroethylene, a liquid crystal polymer, a cycloolefin polymer, polyimide, polyether ether ketone, polyphenylene sulfide, a thermosetting resin, or an ultraviolet curing resin.

6. The connector device according to claim 1, wherein the coupling portion has a choke structure around the open end.

7. A connector device comprising a waveguide tube having a coupling portion at a distal end portion and configured to transmit a high-frequency signal while an open end of the coupling portion is arranged in a state contacting or placed close to another waveguide tube having a coupling portion at a distal end portion,
   wherein the coupling portion of the waveguide tube includes a metallic tube and a dielectric substance provided inside at least a part of the metallic tube,
   wherein the coupling portion has a choke structure around the open end of the coupling portion, and
   wherein a depth of a groove of the choke structure is ¼ of a wavelength of a high frequency transmitted by the two waveguide tubes.

8. A connector device comprising a waveguide tube having a coupling portion at a distal end portion and configured to transmit a high-frequency signal while an open end of the coupling portion is arranged in a state contacting or placed close to another waveguide tube having a coupling portion at a distal end portion,
   wherein the coupling portion of the waveguide tube includes a metallic tube and a dielectric substance provided inside at least a part of the metallic tube,
   wherein the coupling portion has a choke structure around the open end of the coupling portion, and
   wherein a groove of the choke structure is filled with the dielectric substance.

9. The connector device according to claim 8, wherein the dielectric substance for the choke structure is polytetrafluoroethylene, a liquid crystal polymer, a cycloolefin polymer, polyimide, polyether ether ketone, polyphenylene sulfide, a thermosetting resin, an ultraviolet curing resin, plastic, engineering plastic, or super engineering plastic.

10. A connector device comprising a waveguide tube having a coupling portion at a distal end portion and configured to transmit a high-frequency signal while an open end of the coupling portion is arranged in a state contacting or placed close to another waveguide tube having a coupling portion at a distal end portion,
    wherein the coupling portion of the waveguide tube includes a metallic tube and a dielectric substance provided inside at least a part of the metallic tube,
    wherein the coupling portion has a choke structure around the open end of the coupling portion, and
    wherein a depth of a groove of the choke structure is different between in a partial groove portion and in another partial groove portion.

11. The connector device according to claim 10, wherein two or more partial groove portions are provided.

12. The connector device according to claim 10, wherein the partial groove portion is provided in a groove portion along a direction of an electric field generated when the waveguide officialdom transmits a high-frequency signal.

13. The connector device according to claim 1, wherein the waveguide tube has a rectangular cross-sectional shape.

14. The connector device according to claim 13, wherein a dimensional ratio between a long side and a short side of the cross section of the waveguide tube is 2:1.

15. The connector device according to claim 14, wherein the waveguide tube has a pair of structural bodies each including a transmission path portion and a coupling portion, and has a structure capable of performing bi-directional communication.

16. The connector device according to claim 15, wherein the pair of structural bodies is integrally formed.

17. A connector device comprising a waveguide tube having a coupling portion at a distal end portion and configured to transmit a high-frequency signal while an open end of the coupling portion is arranged in a state contacting or placed close to another waveguide tube having a coupling portion at a distal end portion,
   wherein the coupling portion of the waveguide tube includes a metallic tube and a dielectric substance provided inside at least a part of the metallic tube, and
   wherein the waveguide tube has a quadrate or circular cross-sectional-shape.

18. The connector device according to claim 17,
   wherein when the waveguide tube has a quadrate cross-sectional shape, bi-directional communication by a horizontally polarized wave and a vertically polarized wave can be performed, and when the waveguide has a circular cross-sectional shape, bi-directional communication by a clockwise polarized wave and an anti-clockwise polarized wave can be performed.

19. The connector device recited in claim 1, wherein the high-frequency signal is a millimeter-waveband signal.

20. A communication device comprising a waveguide tube having a coupling portion at a distal end portion and configured to transmit a high-frequency signal while an open end of the coupling portion is arranged in a state contacting or placed close to another waveguide tube having a coupling portion at a distal end portion,
   wherein the coupling portion of the waveguide tube includes a metallic tube and a dielectric substance provided inside at least a part of the metallic tube, wherein the metallic tube has an open end surface covered with an insulation layer; and
   the communication device is coupled to another communication device including the other waveguide tube, and transmits the high-frequency signal to the other communication device in the state where open ends of both of the waveguide tubes contact each other or are placed close to each other.

21. The communication device according to claim 20, wherein the high-frequency signal is a millimeter-waveband signal.

* * * * *